(12) United States Patent
Wink et al.

(10) Patent No.: US 11,612,466 B2
(45) Date of Patent: *Mar. 28, 2023

(54) HAND TOOL

(71) Applicants: Cherie Yvette Wink, Yorba Linda, CA (US); Petra Beate Wilder Smith, San Juan Capistrano, CA (US)

(72) Inventors: Cherie Yvette Wink, Yorba Linda, CA (US); Petra Beate Wilder Smith, San Juan Capistrano, CA (US)

(73) Assignee: BitByte Dental Innovations, LLC, San Juan Capistrano, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/395,446

(22) Filed: Aug. 5, 2021

(65) Prior Publication Data

US 2021/0361398 A1    Nov. 25, 2021

Related U.S. Application Data

(63) Continuation-in-part of application No. 16/482,819, filed as application No. PCT/US2019/028133 on Apr. 18, 2019, now Pat. No. 11,219,994.

(Continued)

(51) Int. Cl.
    *B25G 1/10*     (2006.01)
    *A61C 3/00*     (2006.01)
    *A61C 17/00*    (2006.01)

(52) U.S. Cl.
    CPC .................................. *A61C 17/00* (2013.01)

(58) Field of Classification Search
    CPC ... B25G 1/02; B25G 1/04; B25G 1/06; B25G 1/025; B25G 1/102; B25D 17/043;
    (Continued)

(56) References Cited

U.S. PATENT DOCUMENTS 1,879,456 A * 9/1932 Parsons ................ B43K 23/004
                                                        401/88
1,950,960 A * 3/1934 Wisser ................. B43K 29/001
                                                       33/27.02

(Continued)

FOREIGN PATENT DOCUMENTS

GB          2466770 A  *  7/2010  ........... B25B 13/481

*Primary Examiner* — Chuck Y Mah
(74) *Attorney, Agent, or Firm* — Master Key IP, LLP; Justin G. Sanders

(57) ABSTRACT

A hand tool apparatus is disclosed as providing an elongate, adaptive ergonomic handle portion. In at least one embodiment, the handle portion provides a pair of opposing handle ends. At least one of the handle ends provides an instrument portion. An at least one bendable core is positioned between the handle ends, the at least one core capable of being selectively bent into a variety of desired shape configurations, and substantially maintaining those shape configurations until the core is intentionally bent into a different desired shape configuration. As a result, the handle portion is capable of ergonomically conforming to a hand of a user while shifting a weight, as well as instrumentation forces and fulcrum of the apparatus and encouraging proper positioning of the instrument portion during use of the apparatus, regardless of the specific procedure to be performed using the apparatus.

18 Claims, 11 Drawing Sheets

Related U.S. Application Data

(60) Provisional application No. 62/660,184, filed on Apr. 19, 2018.

(58) Field of Classification Search
CPC ......... B25J 1/02; A61C 3/00; A61M 25/0144; A61M 25/0136; Y10T 16/476; Y10T 16/469; Y10T 16/4576; Y10T 16/44
See application file for complete search history.

(56) References Cited

U.S. PATENT DOCUMENTS

| | | | | |
|---|---|---|---|---|
| 3,435,905 A * | 4/1969 | Lazarus | ................... | A61C 1/18 173/213 |
| 4,580,919 A * | 4/1986 | Ambasz | ............... | B43K 24/026 401/214 |
| 5,397,304 A * | 3/1995 | Truckai | ............. | A61M 25/0147 604/528 |
| 6,314,617 B1 * | 11/2001 | Hastings | ................ | A63B 60/08 16/431 |
| 6,328,494 B1 * | 12/2001 | Moxon | .................. | B43K 5/005 206/374 |
| 6,527,464 B2 * | 3/2003 | Lee | ..................... | B43K 23/012 401/6 |
| 6,729,877 B2 * | 5/2004 | Rahman | ................... | A61C 3/00 433/141 |
| 6,974,416 B2 * | 12/2005 | Booker | .................. | A61B 8/445 600/459 |
| 7,108,439 B2 * | 9/2006 | Zhu | ....................... | B43K 25/02 401/109 |
| 7,128,484 B2 * | 10/2006 | Schulken | ............. | B43K 23/008 401/6 |
| 8,167,616 B2 * | 5/2012 | Jamnia | ..................... | A61C 3/00 433/143 |
| 10,065,791 B1 * | 9/2018 | Charles | ................. | B65D 83/20 |
| 10,232,662 B2 * | 3/2019 | Swaminadhan | ....... | B43K 8/024 |
| 2004/0248063 A1 * | 12/2004 | Willat | ..................... | A61B 1/24 433/141 |
| 2005/0201810 A1 * | 9/2005 | Zhu | ....................... | B43K 25/02 401/6 |
| 2007/0127973 A1 * | 6/2007 | Comstock | ............ | B43K 23/004 401/6 |
| 2008/0131842 A1 * | 6/2008 | Edwards | ................ | A46B 5/025 433/215 |
| 2012/0167348 A1 * | 7/2012 | Adams | ................... | B25G 1/102 16/426 |
| 2015/0352891 A1 * | 12/2015 | Provda | ................. | B43K 23/004 401/6 |
| 2016/0039129 A1 * | 2/2016 | Hou | ......................... | B26B 3/02 76/104.1 |
| 2017/0072735 A1 * | 3/2017 | Swaminadhan | ..... | B43K 17/005 |

* cited by examiner

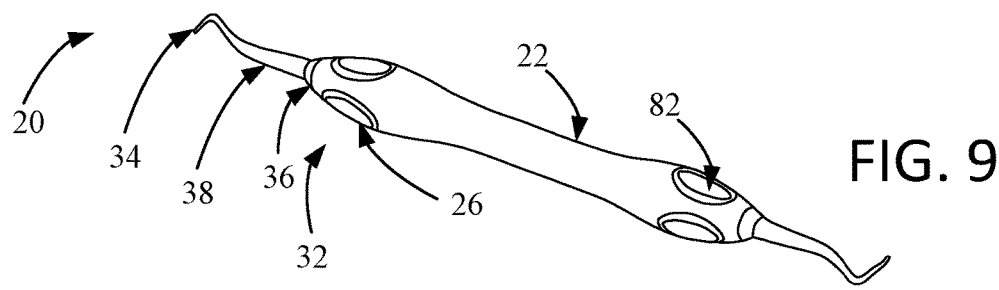
FIG. 9
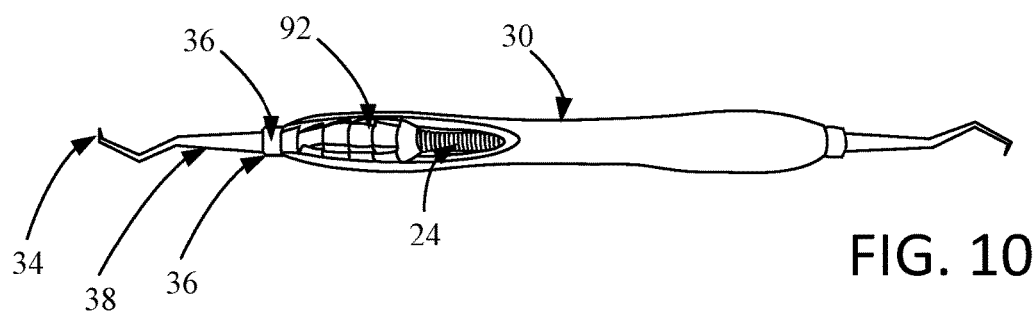
FIG. 10
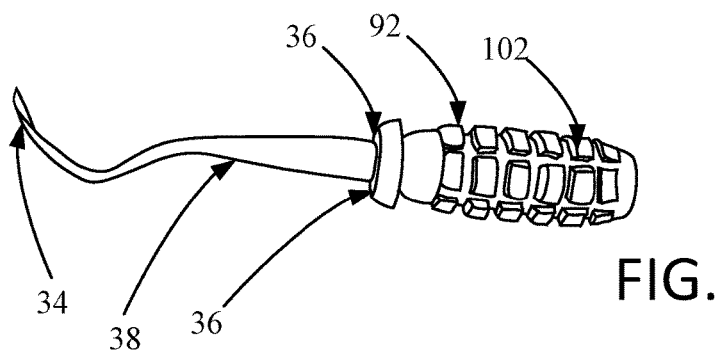
FIG. 11
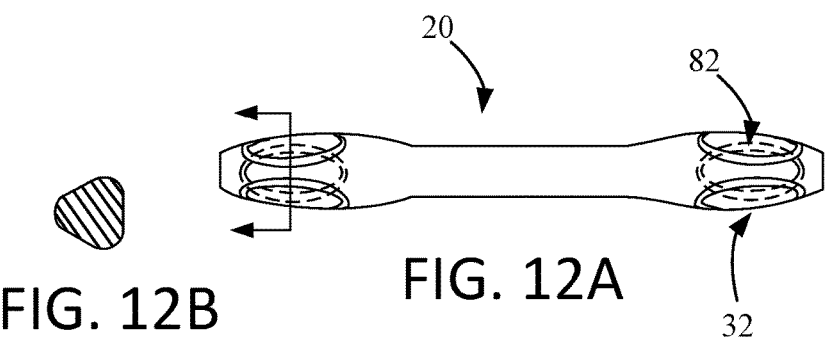
FIG. 12B  FIG. 12A  FIG. 12C

1702

1702

HAND TOOL

RELATED APPLICATIONS

This application claims priority as a continuation-in-part to U.S. patent application Ser. No. 16/482,819, filed on Aug. 1, 2019, which is a national stage under 35 U.S.C. 371 to International application number PCT/US2019/028133, filed on Apr. 18, 2019, which claims priority and is entitled to the filing date of U.S. provisional application Ser. No. 62/660,184, filed on Apr. 19, 2018. The contents of the aforementioned applications are incorporated herein by reference.

BACKGROUND

The subject of this patent application relates generally to hand tools, and more particularly to a hand tool apparatus having an adaptive ergonomic handle.

Applicant(s) hereby incorporate herein by reference any and all patents and published patent applications cited or referred to in this application.

By way of background, development of musculoskeletal disorders ("MSD") is a significant, well-documented problem in the profession of dentistry and dental hygiene with 64%-93% of clinicians experiencing pain. According to the Bureau of Labor Statistics in 1998, dental hygienists rank first amongst all occupations in the U.S. for the highest number of carpal tunnel syndrome cases per 1,000 employees, particularly due to multiple forms of instrumentation fatigue, which affects treatment quality, efficacy, and a hygienist's ability to work a full day/week. The adverse consequences of existing instrument design on the anatomy of the hand, wrist, and forearm include conditions such as arthritis, trigger finger, and hyperlaxity caused by weakened or stretched ligaments. Individuals with a joint hyperlaxity condition in their fingers will have difficulty grasping an instrument without having the thumb collapse or hyperextend on the instrument. Ulnar nerve neuropathy or dysfunction, tendonitis, and thoracic outlet syndrome are additional musculoskeletal injuries commonly seen in dental care providers. With hands being the most important asset of oral health care providers ("OHCP"), maintaining proper and optimal ergonomic practices is crucial to career longevity, treatment efficacy, and clinician health.

Fundamentals of scaling and root debridement are broken down into components such as grasp, fulcrum, blade adaptation, angulation, and stroke. Each component of this intricate task works collectively to achieve optimal function and efficacy during the instrumentation process. The modified pen grasp involves specific finger positioning. This grasp is much more intricate than the way a pen is held. The thumb and index finger should be positioned opposite one another, allowing for control and balance of the instrument handle. The middle finger is placed on the lower shank to feel or receive vibrations transmitted from the working end while the ring finger functions to stabilize and support hand control and improve strength during instrumentation. The pad of the ring finger also functions for fulcrum placement allowing for pivoting and rotation during stroke initiation. The middle and ring fingers should be kept in contact during a modified pen grasp to provide increased stability and strength. Other grasps such as the inverted pen, palm, and thumb and modified palm and thumb grasps all require some level of force transfer onto the rigid instrument handle.

Despite recommendations by instrumentation experts to avoid doing so, dental clinicians often split their fulcrum fingers, or veer from the adopted techniques of their grasp, to improve access or achieve acceptable blade to tooth angulation of sixty to eighty degrees in hard to reach areas of the mouth, and to attempt to overcome the rigidity, shape, and geometry of instrument handles. This increases their risk for developing a MSD. Splitting the fourth finger from the middle finger or allowing the joint of the index finger or thumb to collapse weakens the ability to apply adequate lateral pressure to the tooth surface, compromising the ability to remove calcified deposits efficiently and completely from the surfaces of a tooth. Additionally, such mal-positioning may cause an instrument to become unbalanced in the hand, increasing the amount of muscle tension required to keep the curette balanced and positioned with the terminal shank parallel to the long axis of the tooth and the functional shank centered over the toe of the blade.

Each part of a curette or other dental instrument plays a specific role in the overall desired clinical effect. Studies show that weight distribution, diameter, cold, and rigid instrument handle materials have a direct effect on pain experiences in fingers, hand, arm, and shoulder. An incorrect grasp on a rigid, non-formable curette handle may lead to the finger pads lifting off the instrument and difficulty controlling it. When engaging a working stroke, the instrument handle should be balanced between the anterior digital region of the index finger and the dorsal first inter-digital space of the hand allowing for stabilization of the instrument.

Successful instrumentation techniques depend on the precise adaptation of the blade to the tooth. Site-specific periodontal curettes have a variety of shank designs for this very reason. For optimal outcomes, it is recommended that the terminal shank be held parallel to the long axis of the tooth in most posterior and anterior regions of the mouth. With this, the face of the blade is offset at approximately 60-70 degrees for optimal performance against the tooth. While this vertical positioning of the terminal shank is consistently taught as proper adaptation, achieving this angle is not always possible. Many anatomical variations and conditions, including small mouths, large teeth, tooth or occlusal mal-positioning, and patients with restricted opening capabilities making obtaining this ideal blade to tooth adaptation a significant challenge. Activation of the curette blade at an angle less than 60 degrees leads to incomplete removal of calculi and the potential of burnishing deposits into the tooth surface instead of removing them. Activation of the blade at an angle greater than 80 degrees can inflict undue trauma to the soft tissues. Other dental and surgical instruments can present challenges with proper adaptation, accessibility, and ergonomics as well.

In an attempt to achieve proper angulation of the instrument or curette blade on the tooth under clinical conditions with poor accessibility, the clinician may compromise their fulcrum, grasp, wrist, shoulder, or neck positioning to achieve proper adaptation. A neutral wrist aligns with proper ergonomics, but in challenges as mentioned above, the clinician may need to flex or extend the wrist to access hard to reach areas. Bending the hand at the wrist during instrumentation may lead to compression of the median nerve within the carpal tunnel of the wrist. It is this repeated pressure on the median nerve that can lead to carpal tunnel syndrome, causing numbness, and tingling in the thumb, index, and middle fingers and/or weakness in the lower arm or wrist. Tendinitis may result when the tendons of the wrist become inflamed due to extending the hand up or down at the wrist repeatedly. Twisting the hand, grasping instruments too tightly, and bending the hand back or to the left or right may cause the tendons on the side of the wrist and the base of the thumb to become inflamed, leading to tenosynovitis. Improper ergonomics have also been associated with the development of thoracic outlet syndrome, bursitis, extensive wad strain, and disc herniation as well.

During instrumentation, the wrist must be kept neutral, as pictured in FIG. 1, to prevent musculoskeletal injury during stroke engagement and activation. FIG. 1 demonstrates a proper neutral (straight) wrist position and proper blade to tooth adaptation; however, again, various patient anatomical and clinical conditions may present challenges to achieving and maintaining such positions during instrumentation, as discussed above.

Handles with lighter weight enhance tactile sensitivity and lessen fatigue. The diameter of curette handles varies widely, typically measuring between 6.5 mm to 11 mm. Instruments with small diameter handles increase muscle activity and the force needed to hold the instrument (pinch force), which over time can lead to premature fatigue and injuries. There is a limited effect of handle diameter, with handles larger than 10 mm having no additional benefits in reducing muscle activity. Therefore, simply increasing instrument handle diameter alone is not a solution to all of the above-mentioned problems.

With all of that said, there remains a need for manual or hand-held instruments that are capable of reducing muscle activity by adjustably molding to the shape of the user's hand, based on where and in which direction force is to be applied with the hand tool, thereby which, in turn, reduces user fatigue, discomfort, muscle work, and injury, and encourages proper hand tool positioning. There currently exits no feature that allows the clinician to shift and spread the weight of the instrument, modify its center of gravity and fulcrum more favorably, and redistribute and spread the instrumentation forces more favorably to reduce the muscle engagement and activity required to hold the handle upright, to perform clinical tasks and to keep the entire instrument in the ideal configuration. Aspects of the present invention fulfill these needs and provide further related advantages as described in the following summary.

It should be noted that the above background description includes information that may be useful in understanding aspects of the present invention. It is not an admission that any of the information provided herein is prior art or relevant to the presently claimed invention, or that any publication specifically or implicitly referenced is prior art.

SUMMARY

Aspects of the present invention teach certain benefits in construction and use which give rise to the exemplary advantages described below.

The present invention solves the problems described above by providing a hand tool apparatus having an elongate, adaptive ergonomic handle portion. In at least one embodiment, the handle portion provides a pair of opposing handle ends. At least one of the handle ends provides an instrument portion. In at least one embodiment, a conforming core is positioned between the handle ends, the at least one core capable of being selectively modified into a variety of desired shape configurations, and substantially maintaining those shape configurations during instrumentation until the core is intentionally adapted into a different desired shape configuration. As a result, the handle portion is capable of ergonomically conforming to the hand of a user while shifting and distributing weight and instrument forces of the apparatus more favorably and encouraging proper positioning of the instrument portion during use of the apparatus, regardless of the specific procedure to be performed using the instrument. Thus, the apparatus, in at least one embodiment, is capable of overcoming the limitations and properties of conventional rigid handles to reduce adverse factors that cause fatigue and repetitive stress injuries, along with other adverse effects such as points of pressure, the amount of force needed to achieve clinical outcomes, finger and hand loading, angulation and configuration, as well as body posture, loading and angulation.

Other features and advantages of aspects of the present invention will become apparent from the following more detailed description, taken in conjunction with the accompanying drawings, which illustrate, by way of example, the principles of aspects of the invention.

DRAWINGS

The accompanying drawings illustrate aspects of the present invention. In such drawings:

FIG. 9 is a perspective view of an exemplary hand tool apparatus, in the form of a dental curette, in accordance with at least one embodiment;

FIG. 10 is a cut away view of an exemplary hand tool apparatus, in the form of a dental curette, in accordance with at least one embodiment;

FIG. 11 is a partial component view of an exemplary hand tool apparatus, in the form of a dental curette, in accordance with at least one embodiment;

FIG. 12A is a component view of an exemplary hand tool apparatus, in accordance with at least one embodiment, while FIG. 12B is a cross sectional view from FIG. 12A, and FIG. 12C is an end view of the partial component of FIG. 12A.

Figure 17A:
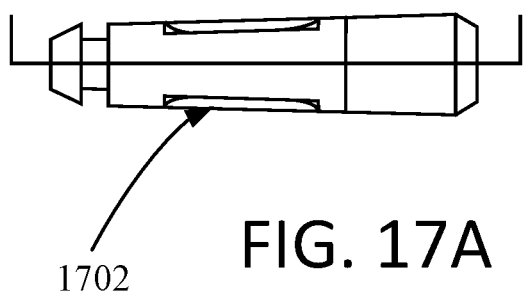
Figure 17C:
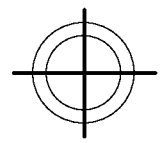
Figure 17B:
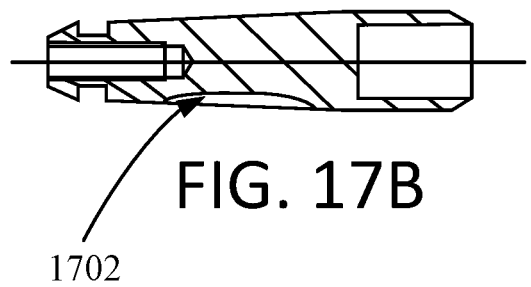

FIGS. 17A-C illustrate exemplary embodiments of a receptacle piece or ferrule with an external design and material that contributes to the fixation of the outer surface (such as an outer silicone overlay).

The above described drawing figures illustrate aspects of the invention in at least one of its exemplary embodiments, which are further defined in detail in the following description. Features, elements, and aspects of the invention that are referenced by the same numerals in different figures represent the same, equivalent, or similar features, elements, or aspects, in accordance with one or more embodiments.

DETAILED DESCRIPTION

Figure 1:
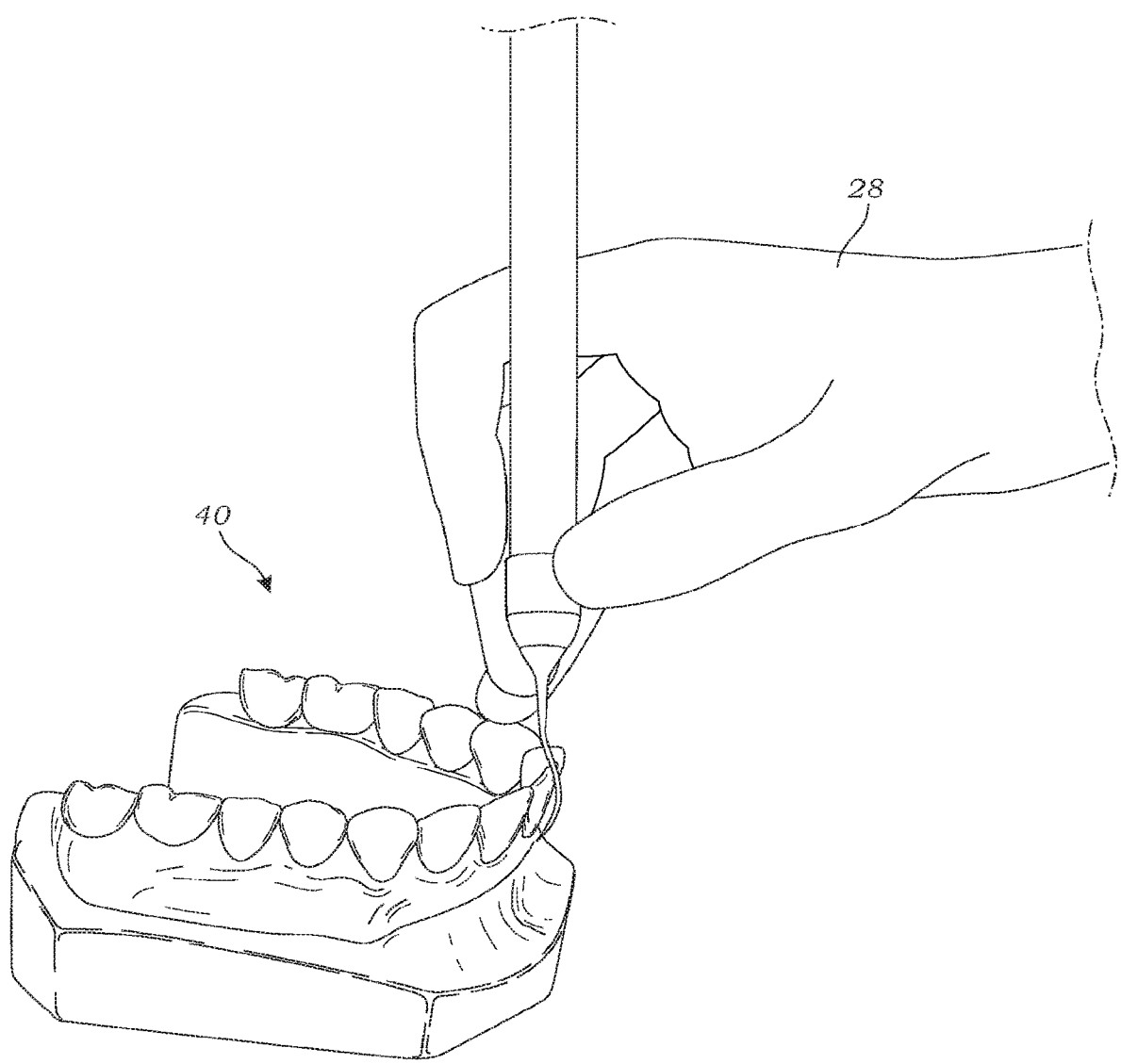
FIG. 1 is a perspective view of a prior art dental curette.
Figure 2:
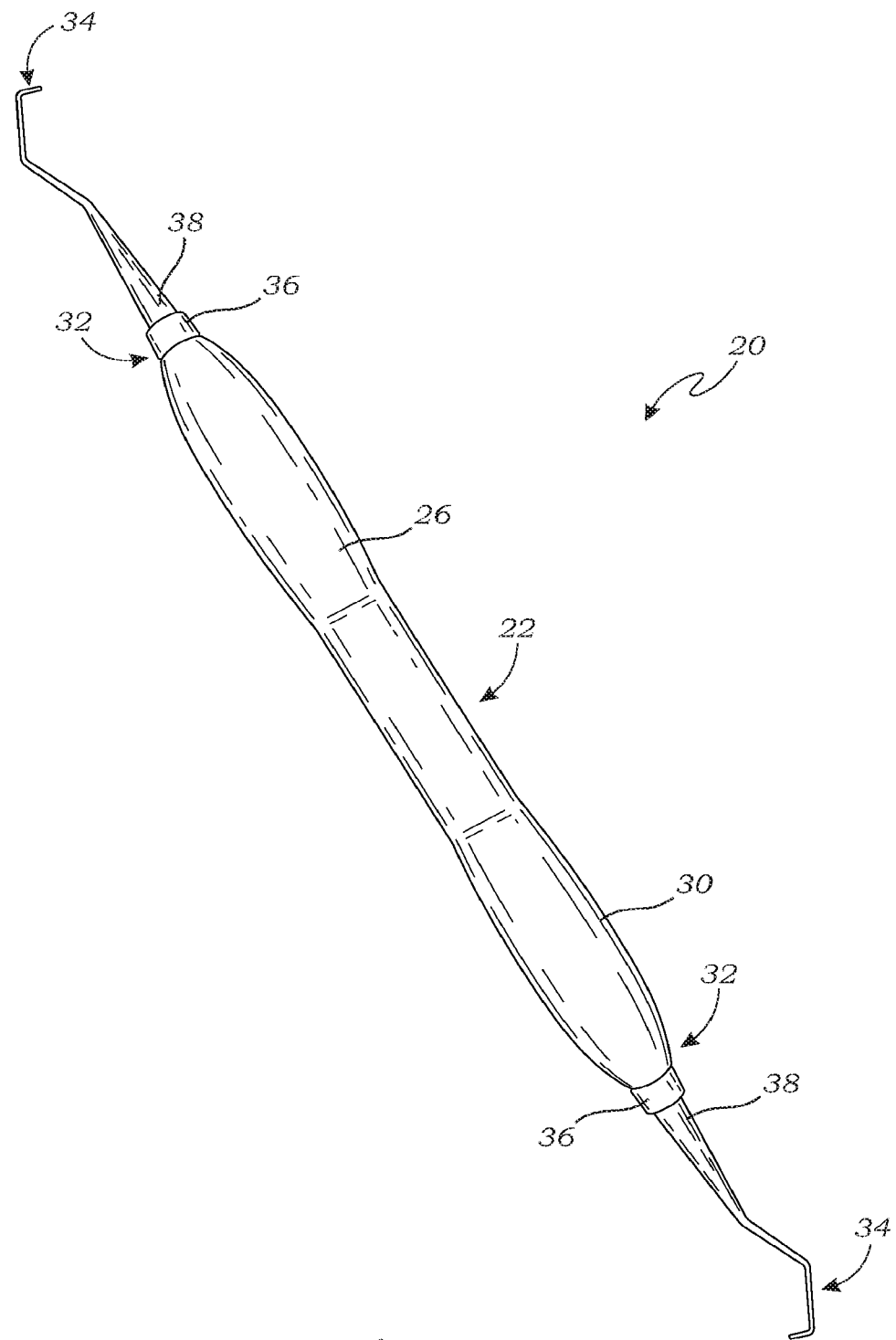
FIG. 2 is a perspective view of an exemplary hand tool apparatus, in the form of a dental curette, in accordance with at least one embodiment.
Figure 3:
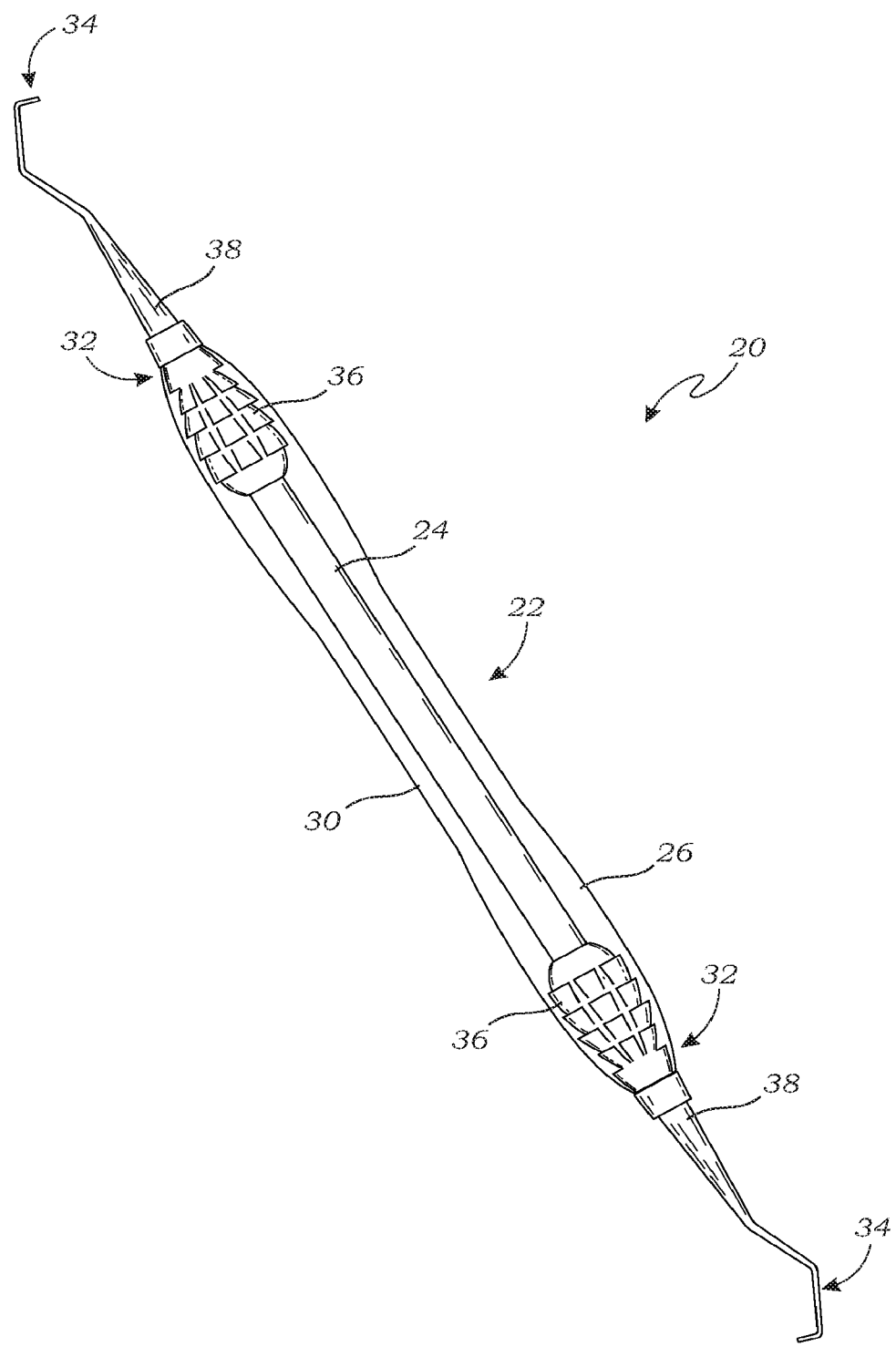
FIG. 3 is a further perspective view thereof, with a grip portion of a handle portion of the apparatus shown as being transparent for illustrative purposes, in accordance with at least one embodiment.
Figure 4:
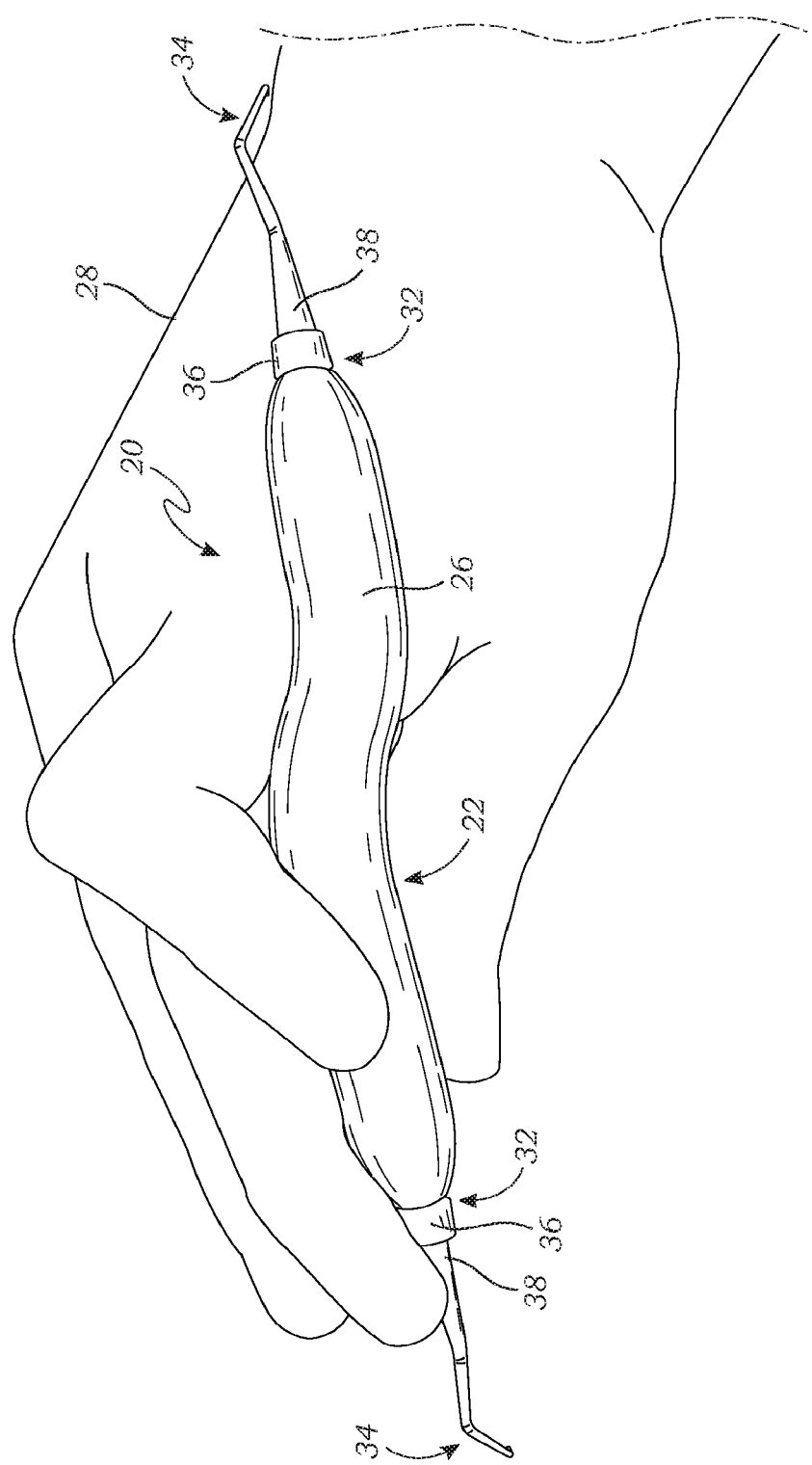
FIGS. 4-7 are perspective views of the exemplary hand tool apparatus in use, in accordance with at least one embodiment.
Figure 5:
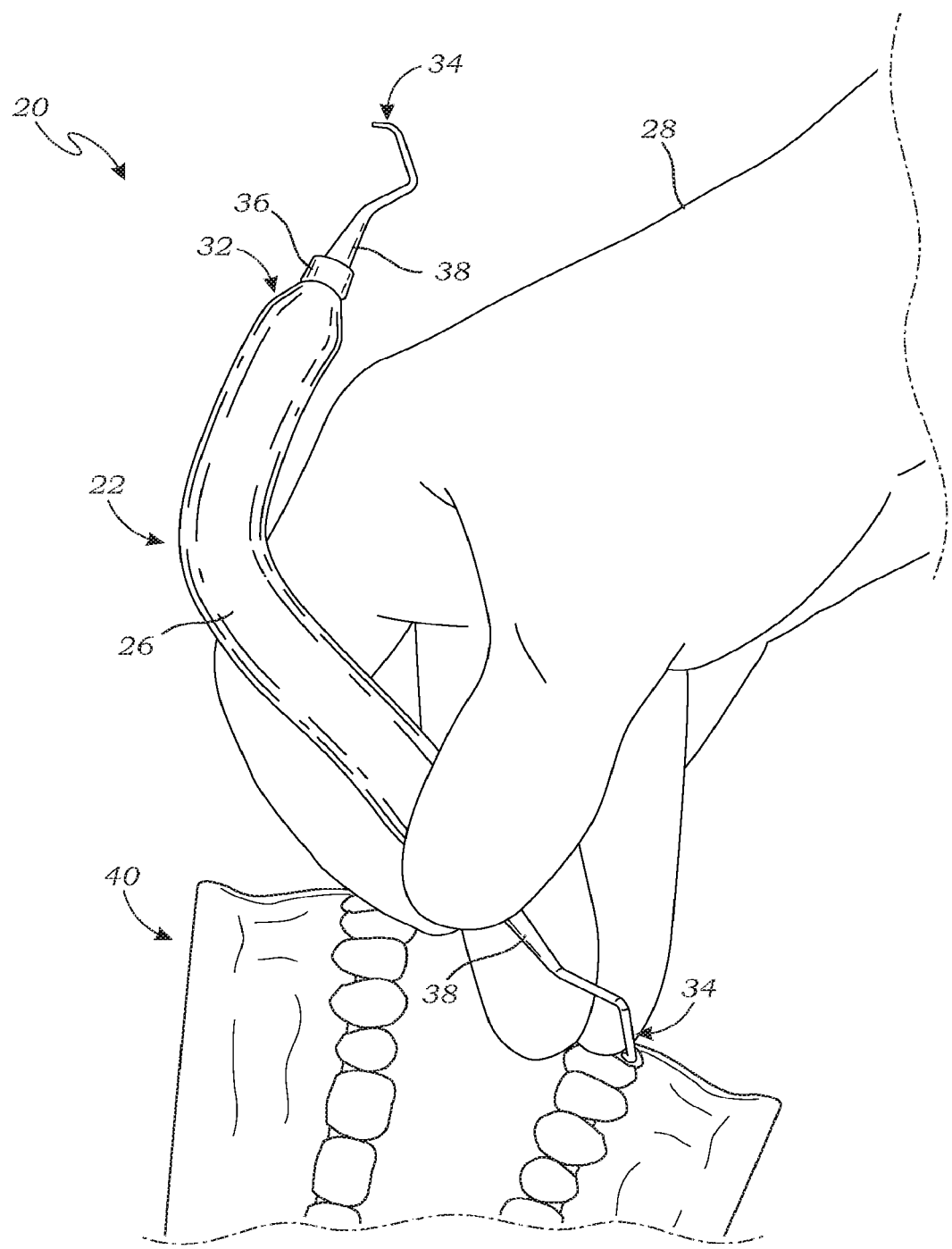
Figure 6:
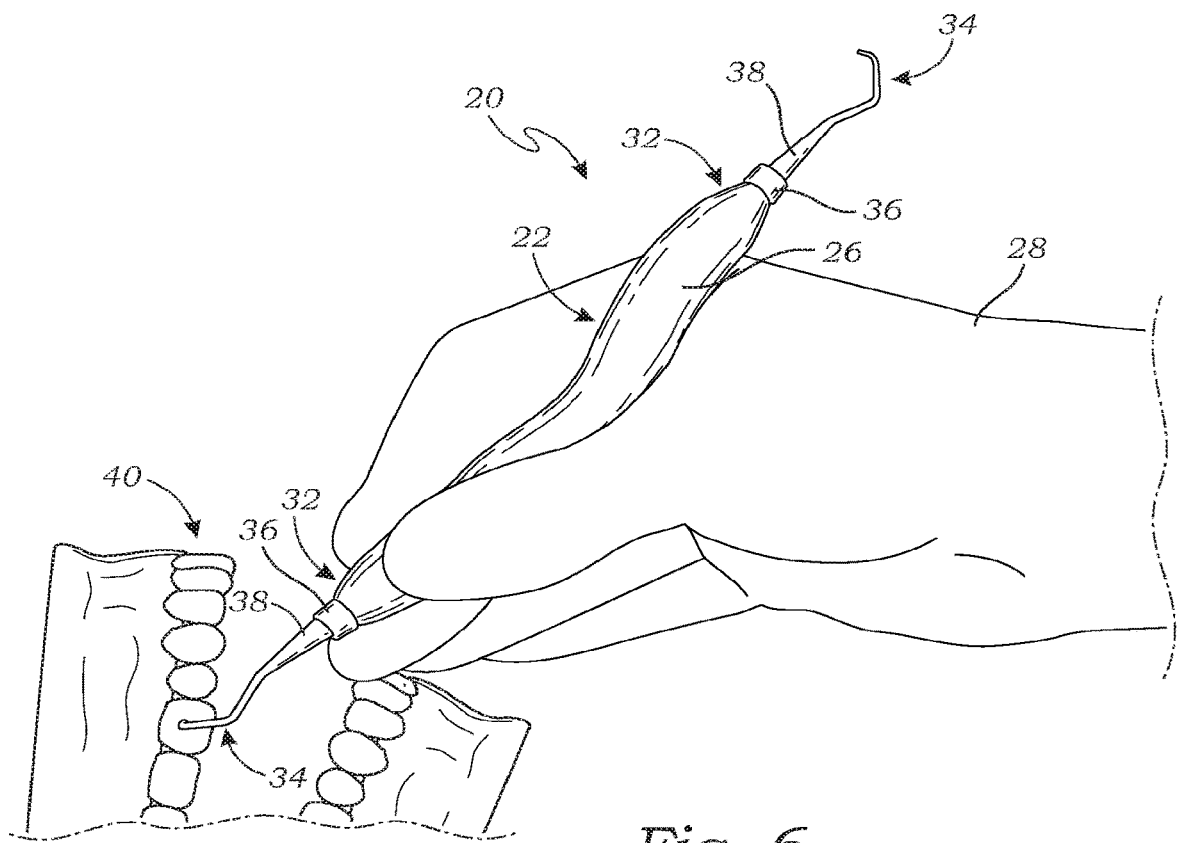
Figure 7:
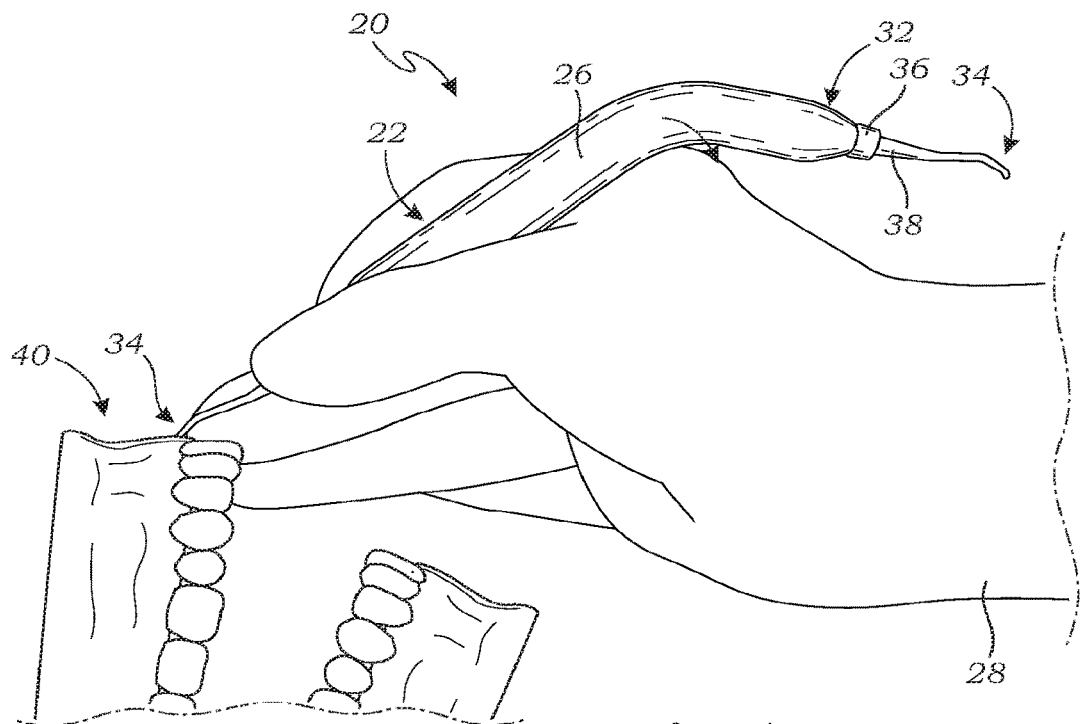

Turning now to FIGS. 2 and 3, there are shown perspective views of an exemplary embodiment of a hand tool apparatus 20 having an elongate, adaptive ergonomic handle portion 22, with the apparatus 20 being configured as a dental curette in this particular embodiment. At the outset, it should be noted that while the apparatus 20 is depicted as a dental curette in the accompanying drawing figures for illustrative purposes, in further embodiments, the apparatus 20 may be configured as any other type of hand tool, now known or later developed, for virtually any industry where the need for such an adaptive ergonomic handle portion 22 exists. Thus, the present invention should in no way be limited to the dental curette context, nor even to the dental industry.

Figure 8:
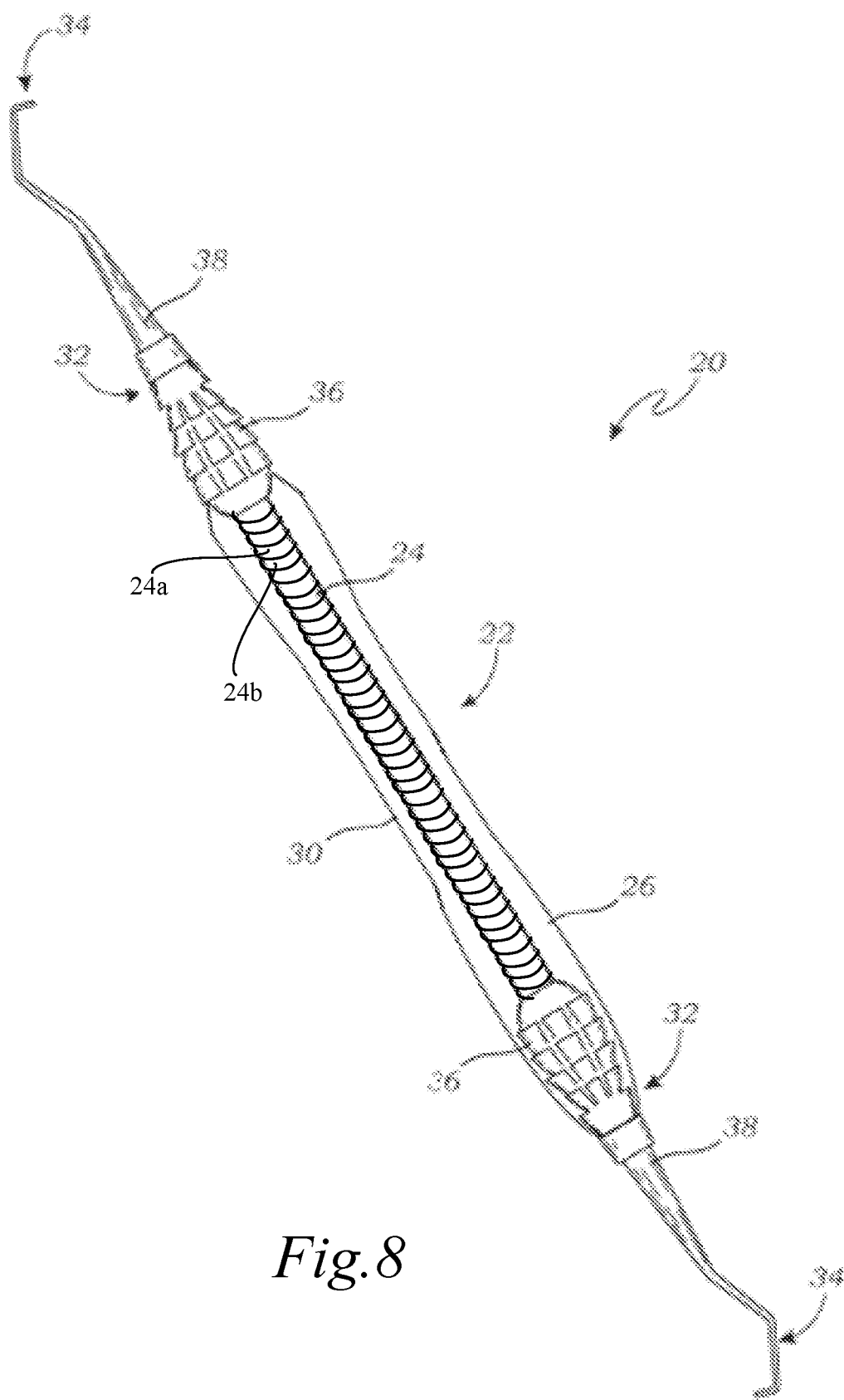
FIG. 8 is a perspective view of an exemplary hand tool with a grip portion of a handle portion of the apparatus shown as being transparent for illustrative purposes, in accordance with at least one embodiment.

In at least one embodiment, the elongate handle portion 22 of the apparatus 20 provides a selectively bendable core 24. In at least one such embodiment, the core 24 is encased within a resilient, deformable grip portion 26—as best shown in FIG. 3, with the grip embodiment, the core 24 is capable of being selectively bendable into a variety of desired shape configurations, and substantially maintaining those shape configurations, in order for the handle portion 22 to ergonomically conform to a hand 28 of a user during use of the apparatus 20 (as illustrated in FIGS. 4-7), while also strategically shifting the weight and distributing the instrumentation forces more favorably of the apparatus 20—regardless of the specific type of hand tool that the apparatus 20 is configured as, and regardless of the specific procedure to be performed using the apparatus 20 (including where and in which direction force is to be applied with the apparatus 20). As a result, the ergonomic configurability along with the selective weight and force shifting of the apparatus 20 allows for the engagement of relatively larger muscle groups in the user's arm in lieu of wrist and/or finger action. Furthermore, utilization of such larger muscle groups facilitates more power while also making the user less susceptible to MSD injury. Moreover, weight and instrumentation forces are spread over the larger surface area of the index finger and back of the hand, with the instrumentation fulcrum repositioned from the grip point to the side and back of the index finger. Additionally, in at least one embodiment, the core 24 is constructed out of a material (or combination of materials) that is capable of withstanding repeated heat sterilization and does not fatigue through being repeatedly bent or molded into a number of different shape configurations over time. In at least one such embodiment, the core 24 is constructed out of an annealed stainless alloy, such as a 316LVM 0.064 annealed stainless alloy, a 316LVM 0.072 super annealed stainless alloy, or a MP35N stainless alloy, for example. In further embodiments, the core 24 may be constructed out of any other materials (or combinations of materials), now known or later developed, that are capable of allowing the core 24 to substantially carry out the functionality described herein. In at least one embodiment, the core 24 is constructed as either a single wire-shaped structure or a multi-stranded wire-shaped structure. In at least one further embodiment, the core 24 is constructed as a coil-shaped structure. As best shown in FIG. 8, the core 24 comprises a first strand 24a and a second strand 24b in a multi-stranded wire-shaped structure in the form of a coil-shaped structure. In still further embodiments, the core 24 may be constructed as any other shapes (and having any other dimensions), now known or later developed, that are capable of allowing the core 24 to substantially carry out the functionality described herein. Again, in such embodiments, not only is the core 24 capable of being selectively bendable into a variety of desired shape configurations, but it is also capable of substantially maintaining those shape configurations during use of the apparatus 20—even where lateral pressure is applied to the apparatus 20 while the user is performing a particular procedure—until the user intentionally bends the core 24 into a different desired shape configuration. In at least one embodiment, the core 24 is sized and configured for being selectively bent and re-shaped single-handedly (i.e., using only one of the user's hands) for ease of use.

In at least one further embodiment (not shown), the handle portion 22 provides two or more selectively bendable cores 24 encased within the grip portion 26—the cores 24 being therebetween.

With continued reference to FIGS. 2 and 3, in at least one embodiment, the grip portion 26 encases the core 24 and extends the entire length of the handle portion 22 to allow for standard precautions of infection control practices (at least where the apparatus 20 is configured for use in such scenarios), configured in such a way as to avoid penetration or collection of infectious and other materials. In at least one alternate embodiment, the grip portion 26 extends less than the entire length of the handle portion 22. In at least one embodiment, the grip portion 26 is constructed out of a material (or combination of materials) that is relatively soft, lightweight, and thermally insulated in order to increase comfort and reduce muscle activity in the user's hand 28 during use of the apparatus 20, while also preserving manual dexterity and reducing symptoms of nerve impairment that is linked to the low temperatures of direct finger-to-steel contact. Additionally, in at least one embodiment, where the apparatus 20 is configured as a hand tool that is to be used on or near human tissue, the grip portion 26 is constructed out of a material that is compatible with human tissue and body fluids, with said material being odorless, tasteless, and capable of preventing bacteria growth thereon. Additionally, in at least one embodiment, the grip portion 26 is constructed out of a material (or combination of materials) that is capable of withstanding repeated heat sterilization. In at least one such embodiment, the grip portion 26 is constructed out of a silicone, such as a silicone having a shore hardness of −35-70+/−5 on the Shore A scale, for example. In further embodiments, the grip portion 26 is constructed out of a rubber/elastomer, or a plastic material. In still further embodiments, the grip portion 26 may be constructed out of any other materials (or combinations of materials), now known or later developed, that are capable of allowing the grip portion 26 to substantially carry out the functionality described herein. In at least one embodiment, the grip portion 26 is constructed as an elongate, substantially cylindrical-shaped structure. In further embodiments, the grip portion 26 may be constructed as any other shapes (and having any other dimensions), now known or later developed, that are capable of allowing the grip portion 26 to substantially carry out the functionality described herein. Additionally, in at least one embodiment, an outer surface 30 of the grip portion 26 may be textured for improving grip and increasing surface area contact of the finger tips.

With continued reference to FIGS. 2 and 3, in at least one embodiment, the handle portion 22 provides a pair of opposing, relatively rigid handle ends 32. In at least one such embodiment, at least one of the handle ends 32 provides an instrument portion 34. In that regard, again, while the instrument portion 34 is depicted as a dental curette in the accompanying drawing figures for illustrative purposes, in further embodiments, the instrument portion 34 may take on any other type of hand tool configuration, now known or later portion 34 may be further configured as a mirror, a periodontal curette, a surgical curette, an elevator, a micro surgery or carving instrument, a bone file, an excavator, a root tip pick, extraction forceps, an endodontic instrument, a cavity preparation instrument, a brush, etc. In still further embodiments, the instrument portion 34 may take on any other type of hand tool configuration, now known or later developed, for virtually any industry where the need for such an adaptive ergonomic hand tool apparatus 20 exists. Thus, again, the present invention should in no way be limited to the dental curette context, nor even to the dental industry. In at least one further embodiment, both handle ends 32 provide an instrument portion 34—either the same type of instrument portion 34 or different types of instrument portions 34.

In at least one embodiment, the instrument portion 34 is integral with, or otherwise permanently engaged with, the corresponding handle end 32. In at least one alternate embodiment, the instrument portion 34 is removably engaged with the corresponding handle end 32. In at least one such embodiment, as illustrated best in FIG. 3, the corresponding handle end 32 provides a tool receiver 36 configured for removably receiving a shank 38 of the instrument portion 34. In at least one such embodiment, the tool receiver 36 is constructed out of a material (or combination of materials)—such as a relatively lightweight metal, polycarbonate, or plastic, for example—that is capable of distributing any vibrations to the shank 38 of the instrument portion 34, thereby allowing for tactile feedback while substantially preventing transmission of vibrations to the user's hand 28 via the handle portion 22. Additionally, in at least one embodiment, the tool receiver 36 enables the apparatus 20 to maintain a sufficient amount of rigidity at the shank 38 so as to allow the user to utilize the instrument portion 34 in an ergonomic yet effective manner. In further embodiments, the tool receiver 36 may be constructed out of any other materials (or combinations of materials), now known or later developed, that are capable of allowing the tool receiver 36 to substantially carry out the functionality described herein. Additionally, in at least one embodiment, at least one tool receiver 36 is substantially encased within the grip portion 26, thereby sealing off the interface between the core 24 and the at least one tool receiver 36 so as to better prevent any collection of potentially infectious materials at said interface and to permit routine sterilization of the apparatus 20. In still further embodiments, any other mechanism (or combination of mechanisms), now known or later developed, capable of achieving a removable engagement between the instrument portion 34 and the corresponding handle end 32, may be substituted.

Turning now to FIGS. 9-17B illustrating an exemplary hand tool apparatus, in the form of a dental curette, in accordance with at least one embodiment, and cut away or component parts of the hand tool apparatus to provide additional features or details that may be included in embodiments of the hand tool described herein.

Turning to FIG. 9, there is shown a perspective view of an exemplary embodiment of a hand tool apparatus 20 having an elongate, adaptive ergonomic handle portion 22, with the apparatus 20 being configured as a dental curette in this particular embodiment. At the outset, it should be noted that while the apparatus 20 is depicted as a dental curette in the accompanying drawing figures for illustrative purposes, in further embodiments, the apparatus 20 may be configured as any other type of hand tool, now known or later developed, for virtually any industry where the need for such an adaptive ergonomic handle portion 22 exists. For example, the tool may have other non-dental uses, such as in medical, veterinary, cutlery, brushes, etc. As more specific examples, the tool may include laryngeal mirror, hairbrushes, toothbrushes, etc. Thus, the present invention should in no way be limited to the dental curette context, nor even to the dental industry.

In at least one embodiment, the apparatus 20 includes an elongate handle portion 22 and instrument portion(s) 34. The elongate handle portion 22 of the apparatus 20 may include any combination of a selectively bendable core 24 and one or more elongate segments 92 creating rigid sections. The rigid sections may define grip portions of the elongate handle portion 22.

With continued reference to FIGS. 9 and 10, in at least one embodiment, the handle portion 22 provides a pair of opposing, relatively rigid handle ends 32. In at least one such embodiment, at least one of the handle ends 32 provides an attachment to an instrument portion 34. In that regard, again, while the instrument portion 34 is depicted as a dental curette in the accompanying drawing figures for illustrative purposes, in further embodiments, the instrument portion 34 may take on any other type of hand tool configuration, now known or later developed. For example instrument portion 34 may be further configured as a mirror, a periodontal curette, a surgical curette, an elevator, a micro surgery or carving instrument, a bone file, an excavator, a root tip pick, extraction forceps, an endodontic instrument, a cavity preparation instrument, a brush, etc. In still further embodiments, the instrument portion 34 may take on any other type of hand tool configuration, now known or later developed, for virtually any industry where the need for such an adaptive ergonomic hand tool apparatus 20 exists. Thus, again, the present invention should in no way be limited to the dental curette context, nor even to the dental industry. In at least one further embodiment, both handle ends 32 provide an attachment to an instrument portion 34—either the same type of instrument portion 34 or different types of instrument portions 34.

As illustrated, the apparatus 20 comprises an elongate handle portion 22 having a selectively bendable core 24 between two rigid handle ends 32 that are rigid sections of the elongate handle portion 22 positioned at opposing handle ends 32 of the elongate handle portion 22. The elongate handle portion therefore includes two instrument portions 34 at opposing ends of the apparatus 20, with rigid grip portions adjacent thereto, and a central section defining a bendable length of the elongate handle portion 22.

A grip portion 26 may define an outer surface 30 that may cover and/or enclose the grip portions and/or the bendable core. FIG. 10 illustrates an exemplary cut away of a portion of the apparatus 20 of FIG. 9. The cut away illustrates exemplary internal components according to embodiments described herein. The internal components as illustrated in FIG. 10 may be included on both opposing ends of the instrument to permit the handling and attachment of instruments as described herein. The instrument may also simply terminate at the bendable core portion and not include the second instrument end as described with respect to exemplary embodiments. Therefore, the disclosure is not limited to a double ended tool, but may include a single ended tool as well.

As illustrated, the corresponding handle end 32 provides a tool receiver 36 configured for removably receiving a shank 38 of the instrument portion 34. The tool receiver 36 may form a portion of the hand end 32 and provide a rigid gripping area within the handle portion of the tool to create support the grip of the user using the gripping portion 26.

As illustrated in FIGS. 3 and 10-11, the tool receiver includes an elongate segment 92 that extends within the handle. This elongate segment 92 may be configured and used to receive the shank 38 of the instrument portion 38 as described herein. It may also comprise an outer surface configured to support and provide a rigid gripping area of the apparatus 20 by a user of the instrument. This elongate segment 92 enables the apparatus 20 to maintain a sufficient amount of rigidity at the shank 38 so as to allow the user to utilize the instrument portion 34 in an ergonomic yet effective manner.

With continued reference to FIGS. 9 and 10, in at least one embodiment, the grip portion 26 encases the core 24 and extends the entire length of the handle portion 22 to allow for standard precautions of infection control practices (at least where the apparatus 20 is configured for use in such scenarios), configured in such a way as to avoid penetration or collection of infectious and other materials. In at least one alternate embodiment, the grip portion 26 extends less than the entire length of the handle portion 22.

In at least one embodiment, the grip portion 26 is constructed as an elongate, substantially cylindrical-shaped structure. In further embodiments, the grip portion 26 may be constructed as any other shapes (and having any other dimensions), now known or later developed, that are capable of allowing the grip portion 26 to substantially carry out the functionality described herein. Additionally, in at least one embodiment, an outer surface 30 of the grip portion 26 may be textured for improving grip. Exemplary embodiment may include varying, locations and/or configurations of the grip portion 26 to provide specific "give" of silicone, softness of silicone, thickness of silicone to assist with comfort and grip of the apparatus 20.

In an exemplary embodiment, the thickness of the cover layer that creates the grip portion 26 may vary in thickness or be graduated along the instrument handle. For example to increase durability where the apparatus 20 bends such as along a portion of the internal core 24, the grip portion or outer cover may comprise a thicker dimension. To accommodate the variability of the internal structure of the handle and/or to provide for different haptic feedback and/or grip responses, the grip portion or outer cover may comprise a thinner dimension (as compared to the thicker dimension) where the finger-tips rest. Such a configuration may be used to optimize haptic feedback such as the vibrations felt by the user during use to detect deposits, tooth anomalies, and to determine the end point of instrumentation/treatment. In addition or alternatively thereto, portions of the grip portion 26 may include different combinations of materials, thicknesses, durometer, etc. Such a construction may also or alternatively provide varying, locations-specific "give" of the grip portion to facilitate the objectives described herein include comfort of grip, haptic feedback, etc.

In at least one such embodiment, the core 24 is encased within a resilient, deformable, and/or soft grip portion 26. As best seen in FIG. 10, the deformable grip 26 may extend along a length of the selectively bendable core 24 and a portion of the rigid handle ends 32. As illustrated in FIGS. 9 and 12A-12C, the handle ends may be shaped and configured to comfortably assist gripping by a user. As shown, the elongate handle 22 and/or grip portion 26 may include a variable outer diameter. The elongate handle 22 and/or grip portion 26 may include handle ends 32 having a greater outer diameter and/or dimension than a middle section of the elongate handle. As seen in FIGS. 3 and 10, elongate segment 92 of the tool receiver 36 may create a variable diameter outer dimension. For example, the elongate segment 92 may have a generally increasing outer diameter from the end of the handle end 32 toward the instrument portion 34, and then a decreasing outer diameter toward an opposite end of the elongate segment 92 toward the internal core 24. When the grip portion 26 is overlaid onto the core 24 and the tool receiver 36 (including the elongate segment 92), the grip portion 26 may conform and similarly include a variable outer diameter in which the ends of the grip portion include a tapered outward and inward sections.

In at least one embodiment, the grip portion 26 is constructed out of a material (or combination of materials) that is relatively soft, lightweight, and thermally insulated in order to increase comfort and reduce muscle activity in the user's hand 28 during use of the apparatus 20, while also preserving manual dexterity and reducing symptoms of nerve impairment that are often caused by the low temperatures of direct finger-to-steel contact. Additionally, in at least one embodiment, where the apparatus 20 is configured as a hand tool that is to be used on or near human tissue, the grip portion 26 is constructed out of a material that is compatible with human tissue and body fluids, with said material being odorless, tasteless and capable of preventing bacteria growth thereon. Additionally, in at least one embodiment, the grip portion 26 is constructed out of a material (or combination of materials) that is capable of withstanding repeated heat sterilization. In at least one such embodiment, the grip portion 26 is constructed out of a silicone, such as a silicone having a shore hardness of 20-70+/−5 on the Shore A scale, for example. Other overlay materials can be used in addition to silicone including but not limited to polyurethane, Synthetic polyisoprene, Thermoplastic Elastomers and Polymers, Natural Rubber Latex, Nitrile, to vary integrity, appearance, color, translucency, patterns, textures, etc. Use a range of silicones and layering, bonding, interfacing techniques to tailor overlay properties to specific use, including stretchability, ductility, and resilience. In further embodiments, the grip portion 26 is constructed out of a rubber/elastomer, or a plastic material. In still further embodiments, the grip portion 26 may be constructed out of any other materials (or combinations of materials), now known or later developed, that are capable of allowing the grip portion 26 to substantially carry out the functionality described herein.

Exemplary embodiments of the grip portion 26 may comprise any combination of the materials, adhesives, layers, or other attributes described herein. For example, the grip portion may include any combination of: silicone; silicone variables; materials other than silicone; materials similar to silicone, latex, polymers, including, without limitation, silicones, poly (ethylene), poly (vinyl chloride), polyurethanes, polylactides, natural polymers, further including without limitation, collagen, gelatin, elastin, silk, and polysaccharide. Additives may also or alternatively be included, such as to provide a non-slip surface(s), increase or decrease stretch, tensile strengths, elongation capabilities, hardness, tear strength, resiliency, tolerance of sterilization, etc. Additives may include, for example, Siltech's additives for wetting agents, slip, mar, glass, flow, leveling, and foam control. Coatings may also or alternatively be included. Gloss agents may also be included that provide higher refractive indices to provide a higher gloss to the instruments or to portions thereof. Pigments may also or alternatively be included, including, without limitation, pearlescent, and/or color shifting. Essential oils, biocides, fungicides, mildewcides, etc. may also be included in any combination. Exemplary embodiments may also include a compartment and/or reservoir that may be refillable and/or accommodate replaceable cartridges of additives, such as scented oils, essential oils, biocides, fungicides, mildewcides, etc. Materials, configurations, compartments, etc. may also be included to act as vehicles for drug delivery, such as, for example, antibacterial such as Stericone Antibacterial Silicone Rubber, neutraSil antimicrobial silicone rubber, silicone rubber-TiO2 composites, Silicone Rubber Compounds, etc. Fillers, including various particle sizes, may also or alternatively be included. Exemplary embodiments may also include surface conditions, such as textures and/or configurations. For example, exemplary embodiments may include blood repellent surfaces such as micro- and/or nano-structured superhydrophobic (SHB) surfaces.

The elongate segment 92 of the tool receiver 36 may also have outward perturbations 102 on an exterior surface thereof. As illustrated, such as in FIG. 3, the outward perturbations may create a generally serrated surface. The outward perturbations 102 may create micro-variations of the outward dimension, while the macro-dimension of the elongate segment 92 generally follows the bulbous or tapered configuration described herein. The outward perturbations 102 and/or the grip portion 26 may be sized and shaped so that the outward perturbation do not affect an exterior surface shape of the grip portion 26 when positioned thereover.

As seen in FIG. 11, the internal components, such as the tool receiver 36 may include an exterior surface to facilitate the stable interface between the components and the grip portion 26 created from an outer layer. The interface between the core 24, the tool receiver 36 including the elongate segment 92 and the grip portion 26 defining the outer surface 30 may include structural features to facilitate a mechanical interlocking, adhesive, material layering, chemical bonds, and combinations thereof. As seen in FIGS. 3 and 11, the outward perturbations on a surface of the internal component(s) may be used to create an increased interlocking connection with the grip portion or layer positioned thereover. Exemplary embodiments may include the outward perturbations 102 that may be made of nylon, polycarbonate, aluminum, or other materials.

Exemplary embodiments of the apparatus 20 described herein may include finger placement guides as illustrated in FIGS. 9 and 12A-12C. The finger placement guides 82 may include indentations formed by the outer surface 30 of the grip portion 26. The finger placement guides 82 may be used to direct finger placement/positioning on the grip portion 26. The finger placement guides 82 may also be used to increase a surface contact area between the user's finger and the apparatus 20, enhancing instrument control during instrumentation and reducing the amount of muscle work required to achieve a standard clinical outcome.

FIG. 12A illustrates an exemplary embodiment of an apparatus 20 including finger placement guides 82. The finger placement guide indicated in dashed lines is on a backside of the instrument. Therefore, as illustrated, three finger placement positions are provided at one handle end 32 of the grip portion 26. As seen in the cross section of FIG. 12B, the finger placement portion may be created by a triangular cross section of the grip portion 26 at the handle end. FIG. 12C illustrates the apparatus elongate handle 22 from an end perspective to illustrate the triangular shaped creating the finger placement guides and the circular cross section of other portions of the elongate handle 22. The finger placement guides may be created through manipulating the thickness of the grip portion 26 covering the tool receiver 36 and/or in manipulating the exterior shape of the tool receiver.

In an exemplary embodiment, the apparatus permits component specific locations, variability, shapes, lengths, and diameters. For example, the elongate handle 22 may comprise variable diameters with specific location or component shapes, thicknesses, and diameters to accommodate finger placement, haptic feedback, and support and maneuverability of the instrument. Exemplary embodiments may include graduated instrument shapes. In an exemplary embodiment, exterior diameters of the grip portion 26 may include and be between 12 and 16 millimeters in the grip area at or adjacent to the handle end 32. Finger placement guide depths may be approximately 0.5 to 2.5 millimeters. Exemplary embodiments may include different handle lengths that may accommodate or better adapt to the varying sizes of clinician's hands.

Figure 13A:
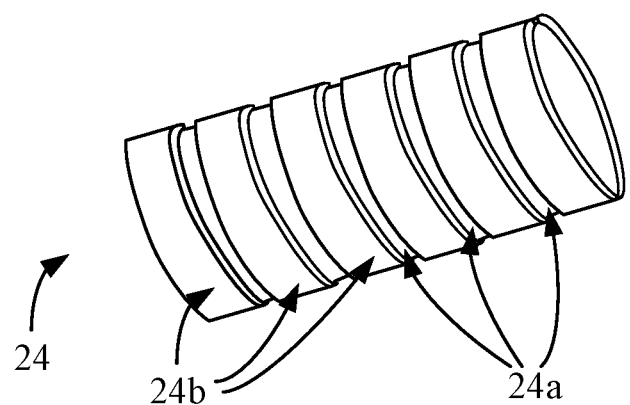
FIGS. 13A-13B is a component view of an exemplary hand tool apparatus, in accordance with at least one embodiment.

As seen in FIGS. 3, 8, and 13A, the apparatus 20 may include an internal core 24 that permits the tool to be bent and maintain a desired bent configuration along a portion of the elongate handle 22. As described herein, the core 24 may be constructed as either a single wire-shaped structure or a multi-stranded wire-shaped structure. In at least one further embodiment, the core 24, may be either a single or multi-stranded structure constructed in a coil-shape. The multi-stranded structure may include two coils positioned within the coils of each other, such as seen in FIG. 8. The multi-stranded structure may include two coils positioned one inside the other, so that an exterior diameter of a first coil is less than an interior diameter of a second coil so that the first coil is radially within the second coil. The multi-stranded structure may also include a coil shaped structure positioned around a straight elongate core strand. The multi-stranded structure may include different coil shaped structure wrapped in opposing direction, for example, in a woven configuration. The wire-shaped structures may be solid wire shapes and/or hollow wire shapes. The wire-shaped structures may have geometric cross sections, such as circular, ovoid, triangular, etc. The multi-stranded structure may have different wire configurations between one or more other strands, such as different cross sectional shape, whether solid or hollow, size, etc.

FIG. 8 illustrates an exemplary multi-stranded structure for a core 24. The exemplary core 24 may include a first wire 24*a* and a second wire 24*b*. As illustrated, the first wire 24*a* and second wire 24*b* may be in an open coiled structure. The first wire 24*a* may fit within the gaps created within the open coils of the second wire 24*b*. The first wire 24*a* and second wire 24*b* may therefore create a closed coiled structure so that the first wire 24*a* is in contact with the second wire 24*b* along a length of the wire structure(s).

Figure 13B:
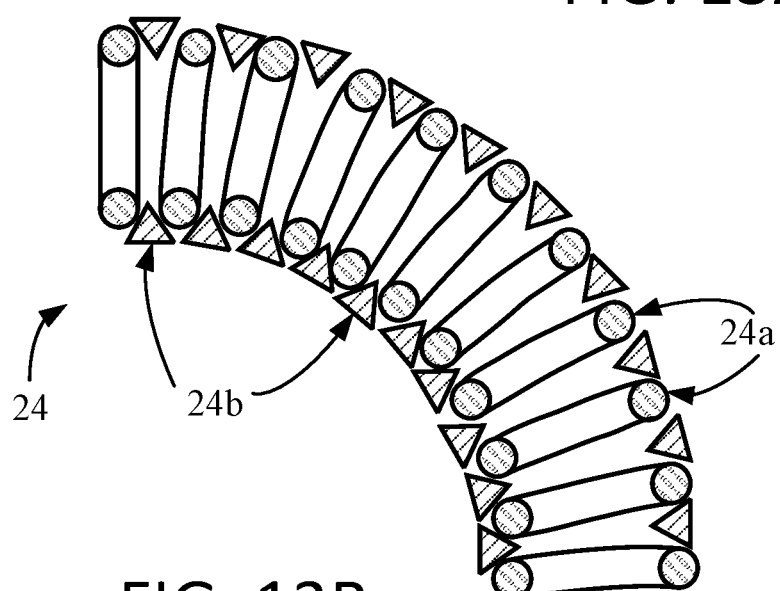

FIGS. 13A-13B illustrates an exemplary multi-stranded structure for a core 24. The exemplary core 24 may include a first wire 24*a* and a second wire 24*b*. FIGS. 13A-13B illustrate exemplary partial and cross sectional views of a portion of an exemplary core 24 according to embodiments described herein. Exemplary embodiments of the core described herein may be incorporated into any embodiment or component combination of the apparatus according to embodiments described herein.

Exemplary embodiments of the first wire 24a may be in a straight or coiled configuration. As illustrated, the first wire 24a may be in a coiled structure. The first wire 24a may be a solid wire structure as illustrated, but may also comprise a hollow wired structure. The first wire 24a may include a circular cross section in a closed or open coil configuration. In a closed coil configuration the adjacent turns of the coil are in contact in a resting configuration, where a resting configuration is when the closed coil defines a linear, central, longitudinal axis through the center of the coil. The first wire 24a may also have alternative cross sectional shapes, such as, for example, rectangular, square, circular, ovoid, triangular, etc. Alternatively, the inner wire may include a straight wire with a circular cross section and hollow structure.

Exemplary embodiments of the second wire 24b, as illustrated, may be in a coiled structure. The second wire 24b may include a triangular cross section in a closed or open coil configuration so that adjacent turns of the coil are in contact or out of contact in a resting configuration. The triangular cross section may be configuration such that a flat side of the triangle is facing radially outward to create a generally circular, cylindrical outer surface of the coiled structure. An apex of the triangular cross section may be configured to point radially inward and create a gap between adjacent turns of the coil on the interior surface or side of the coiled structure. Having the apex of the coil providing a gap on an interior side of the coil may permit flexibility and bending of the coil structure. As illustrated in FIG. 13B, as the core structure flexes or is bent, the apex of the exterior coil may transition into positions between the coil structure of the inner coil. For example, the turns of the exterior coil from the second wire 24b may penetrate between the gaps of the inner coil of the first wire 24a thereby creating or maintaining a more continuous surface structure. In an exemplary embodiment, a maximum, outer diameter of the first wire 24a structure along an exterior perimeter thereof (as defined by the wire structure—such as an exterior diameter of the first wire 24a is in a straight configuration or an exterior diameter of the coiled configuration) may be approximately equal to or greater than a minimum, inner diameter of the second wire 24b along an interior perimeter of the second wire coil. The maximum, outer diameter of the first wire 24a structure may be between a maximum outer diameter and a minimum inner diameter of the second wire 24b structure, such that the outside edge of the first wire 24a is positioned between portions or turns of the second wire structure 24b. In an exemplary embodiment, a maximum, outer diameter of the first wire 24a structure along an exterior perimeter thereof (as defined by the wire structure—such as an exterior diameter of the first wire 24a is in a straight configuration or an exterior diameter of the coiled configuration) may be approximately equal to or less than a minimum, inner diameter of the second wire 24b along an interior perimeter of the second wire coil. In an exemplary embodiment, the exterior perimeter of the first wire 24a structure may be in contact with all or a portion of the interior perimeter of the second wire 24b structure.

In an exemplary embodiment, the core comprises a first coil structure and a second coil structure. The first coil structure is positioned radially within the second coil structure. The first coil structure and the second coil structure may comprise turns of the coil that are offset such that turns from the first coil structure are positioned between turns of the second coil structure. The first coil structure and the second coil structure may be positioned to overlap in a radial direction so that a portion of the second coil structure is positioned between portions of the turns of the first coil structure.

In an exemplary embodiment, the first and/or second wire may comprise any combination of carbon fiber, high carbon stainless steel, stainless steel, brass, stainless steel alloys, cobalt alloys, titanium alloys, nickel-titanium, Nickel-titanium alloys, cobalt-chromium, and cobalt-chromium alloys. In an exemplary embodiment, the first wire 24a comprises high carbon stainless steel and the second wire 24b comprises brass.

Exemplary embodiments of the double coiled steel-brass wire can withstand over 100,000 bends to prevent fatigue throughout the duration of its use. The high-strength inner stainless-steel coil provides strength and flexibility to allow the device to conform to the clinician's hand while the soft outer triangular shaped copper wire (or other materials) compresses into the coil of the inner wire to provide stiffness and allowing for the core to maintain its shape.

Exemplary embodiments may include or permit variation of the instrument stiffness. For example, the instrument may include flexible portions and rigid portions. The flexible portions may include variable flexibilities. The stiff or flexible portions may be localized and/or provided over a range or all of the apparatus and/or elongate handle 22. Exemplary embodiments may use different combinations of materials, structural features, layers, thicknesses, shapes, or core configurations (including single and/or multi-stranded configurations, woven and/or coiled and/or straight configurations, closed and/or open coil structures, geometric cross sections of the wires). In an exemplary embodiment, the flexibility of the apparatus along specific areas of the apparatus may be determined, at least in part, by the ductility of the core, such as based on the material selection, the structure features of the core (including, without limitation, the number of strands, the orientation of the strands (coiled, straight, or woven), whether the strand is solid or hollow, whether the core comprises multiple materials, etc.). The flexibility of the apparatus along specific areas of the apparatus may be determined, at least in part, by the flexibility and/or elasticity of the outer covering defining the grip portion 26. The flexibility and/or elasticity of the outer covering may be determined based on the material selection, the durometer, the thickness, and other considerations as described herein.

Figure 14:
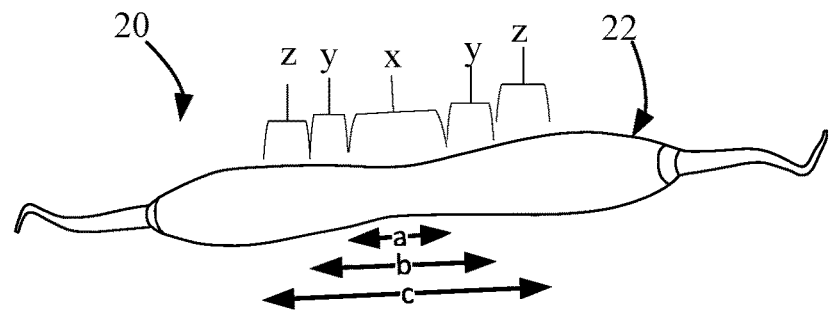
FIG. 14 illustrates an exemplary representation of variable flexibility and/or stiffness along different lengths of the instrument.

FIG. 14 illustrates an exemplary representation of variable flexibility and/or stiffness along different lengths of the instrument. Exemplary embodiments described herein may permit the flexible portions of the instrument to be continuous or intermittent. Exemplary embodiments may permit the apparatus to bend through one or more of the bendable core material and/or configuration and/or bendable sheet material and/or configuration. Exemplary embodiments may include a bendable feature at the working of the elongate handle, such as at the shank and/or interface between the shank and the handle. As illustrated, internal and/or external structures may permit component parts of the elongate handle 22 to comprise different degrees of flexibility, a, b, c. The different degrees of flexibility contributed by the different component parts may create different flexibilities of the elongate handle 22 along different portions of the handle x, y, z.

Figure 15:
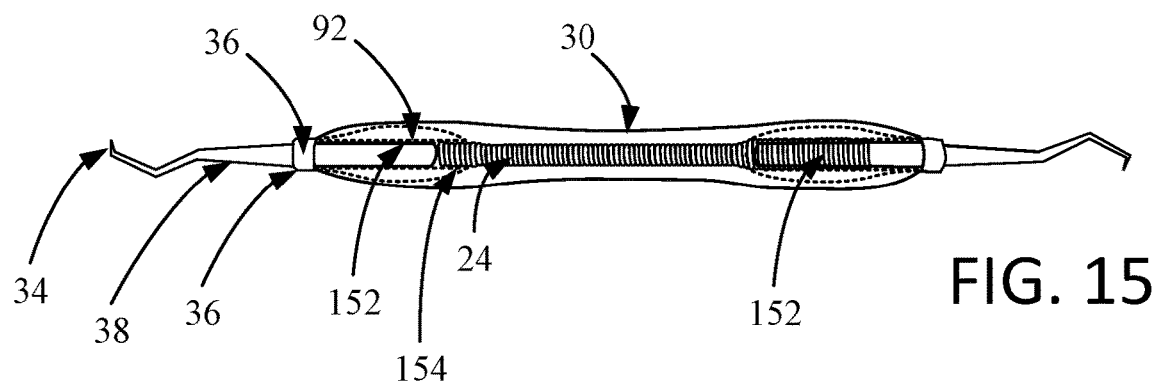
FIG. 15 illustrates an exemplary view of an exemplary hand tool apparatus in which internal components are illustrated for purposes of representation.
Figure 16:
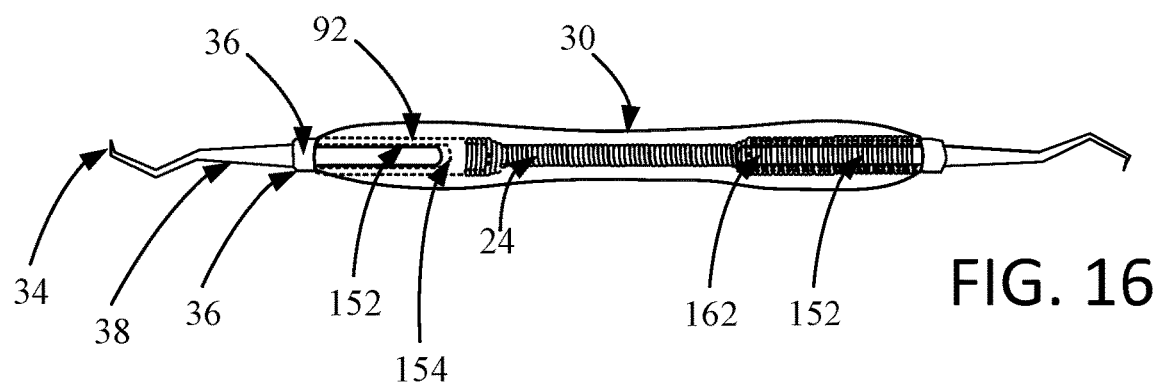
FIG. 16 illustrates an exemplary view of an exemplary hand tool apparatus in which internal components are illustrated for purposes of representation.

FIGS. 3, 8, 10, 11, 15, and 16 illustrate exemplary embodiments of a tool receiver 36. The tool receiver 36 may create an interface piece or ferrule that may connect the working ends (instrument portions 34) with the core 24 and/or the elongate handle 22. As illustrated in FIGS. 15 and 16, the tool receiver 36 may include an internal receptacle 154 within the elongate portion 92. The elongate portion 92 and internal receptacle 154 of the tool receiver 36 of FIGS. 15 and 16 are illustrated in dashed lines for the sake of illustration and distinguish these components from, for example, the core 24 and/or instrument portion 34. As described herein, the instrument portion 34 may include a shaft 38. The shaft 38 may include an extended portion 152 (illustrated in solid lines) that is configured to fit within the internal receptacle 154 of the tool receiver 36. As illustrated, the extended portion 152 may be continuous with the shaft 38 and instrument portion 34. The extended portion 152 may extend a length of the tool receiver and/or a majority of the tool receiver. The overlap of the extended portion 152 of the instrument within the tool receive may be used to add additional strength and improve the interface between the instrument portion and the elongate handle. The extended portion 152 of the instrument portion 34 may terminate within the internal receptacle 154 of the tool receiver 36 such as seen in FIG. 15 or may extend past a terminal end of the tool receiver and into the core and/or elongate handle 22, such as seen on the right side of FIG. 16.

In an exemplary embodiment, the core 24 may overlap with a portion of the tool receiver. As seen in FIG. 15, the core 24 may extend within an internal receptacle 154 of the elongate portion 92 of the tool receiver 36. As illustrated in FIG. 15, the internal receptacle 154 of the tool receiver 36 may extend an entire length of the tool receiver, such that the extended end of the instrument portion is received on one end of the tool receiver and the core is received on a second end opposite the first end. Alternatively, separate internal receptacles may be provided at opposing ends of the tool receiver to receive an instrument portion at one end thereof and the core at an opposite end thereof. As seen in FIG. 16, the core may extend around an exterior surface of the elongate portion 92 of the tool receiver 36. In this case, the tool receiver 36 may include an extended portion 162 that may fit within an interior surface of the core 24. The core 24 may be coupled to a terminal end of the tool receiver 36, may extend within the tool receiver such as within the internal receptacle 154 as illustrated in FIG. 15, or may extend around the elongate portion 92 of the tool receiver 36 as illustrated in FIG. 16.

In an exemplary embodiment, the extended portion 152 of the instrument portion 34 may terminate before the core 24 within the internal receptacle 154, as illustrated on the left side of FIGS. 15 and 16, or the extended portion 152 may be positioned within the core 24 and the internal receptacle 154 as illustrated on the right side of FIGS. 15 and 16.

The exterior profiles of the core and/or elongate portion 92 of the tool receiver 36 may also be shaped according to embodiments described herein. For example, the exterior shape of the tool receiver may include a tapered profile as illustrated in FIGS. 3, 8, and 15. The exterior shape of the tool receiver may also be configured to match the exterior shape of the core 24 such as illustrated in FIG. 16.

The internal receptacle and/or core, and/or extended portion may include mated surfaces to facilitate the attachment of the instrument portion 34 to the elongate handle 22. For example, the instrument portion may click into, crimp fit, screw, frictionally engage, or otherwise be connected to or secured within the internal receptacle and to the elongate handle 22. Exemplary embodiments of the tool receiver 36 and/or elongate portion 92 may include polycarbonate, nylon, resin, plastic, metals, metal alloys, and combinations thereof. For example, the tool receiver 36 may comprise aluminum, stainless steel, Nitinol, and their alloys.

Exemplary embodiments may include crimp joints and/or adhesive to join the working tips to the interface piece (ferrule). The outer material may be a medical grade silicone with a durometer of 50-65. Exemplary embodiments of the ferrule is constructed of resin and/or nylon, but may additionally or alternatively be made of materials such as alumina or other appropriate material with sufficient strength and light weight. Exemplary embodiments of the exterior surface may comprise an outer layer and/or tube shrunk onto the outer surface of the inner core portion(s). The outer layer may also or alternatively be constructed by wrapping material about the inner core portion(s).

Exemplary embodiments may comprise shape memory materials. For example, exemplary embodiments of the core and/or grip portion may include shape memory material (such as Nitinol, Ninol alloys, or other materials) that may be flexible within a working temperature of environment. The shape memory material may therefore permit the deformation and retained deformation of the apparatus during use. The shape memory material may comprise a remembered configuration under preset conditions, such as temperature. The elongate handle 22 may be configured to automatically return to a remembered configuration (such as straightened or a pre-set bend configuration). The return to a remembered configuration may be over time, or upon application of a specific environment, such as heat or steam under pressure sterilization.

Exemplary embodiments may include one or more sensors. For example, the apparatus 20 described herein may include wired and/or wireless sensors. For example, a Bluetooth sensor may be configured within the elongate handle to communicate with an external electronic device, such as a smart phone, watch, tablet, or computer. An application running on the external electronic device may be configured to receive information from the sensor of the apparatus. For example, the application may receive information about sterilization conditions, such as temperature, duration, date, etc. The application may then store in memory items associated with the apparatus and/or its received sensor information, such as to track the sterilization process. Exemplary embodiments of sensors may also or alternatively include radio frequency devices, such as for identification through radio frequency identification (RFID). Each apparatus may use the RFID to uniquely identify the apparatus and/or track information associated with the apparatus, such as manufacturer, date of manufacture, sterilization times, use times, etc.

Exemplary embodiments may also include additional removable and/or fixed structures with the apparatus to facilitate grasping of the device. For example, additional components, such as layers, sheaths, covers, etc. may be coupled to the elongate handle to improve grasp or hold. The additional components may provide finger placement guides, different compression resistance of the grip portion, etc.

FIGS. 17A-C illustrate exemplary embodiments of a receptacle piece or ferrule with an external design and material that contributes to the fixation of the outer surface (such as an outer silicone overlay). Exemplary embodiments of the receptacle piece or ferrule may be designed with surface finger guide concavities 1702 that may direct clinician's finger placement to ensure proper grasp, increase contact surface area between the fingertip and the instrument surface to reduce pressure/area and instrumentation forces, facilitates control, and/or reduces slipping during instrumentation to improve instrumentation efficacy by reducing slippage, support improved instrument control, especially when the clinician's grasp is extended towards the center of the handle (telescoped) to extend their reach during instrumentation, or any combination thereof. The line which extends all the way through the representative receptacle piece may represent the working stainless tip or other instrumentation.

The ferrule or interface piece designed with surface finger guide concavities that direct clinicians' finger placement to ensure proper grasp, increase surface contact area between the fingertips and the instrument, and support improved instrument control, especially when the clinician's grasp is extended towards the center of the handle (telescoped) to extend their reach during instrumentation.

As mentioned above, the particular sizes, shapes, and dimensions of the various components of the apparatus 20 described above and depicted in the accompanying drawings are merely exemplary. In practice, these components may take on any other size, shape, and/or tool that the apparatus 20 is configured as, as well as the specific procedure to be performed using the apparatus 20—in order to optimize grip, ergonomics, reach, and any other clinical requirements for a given use case. As a result, and as illustrated in the exemplary use cases of FIGS. 4-7, the apparatus 20 is capable of adjustably molding to the shape of the user's hand 28, based on where and in which direction force is to be applied with the instrument portion 34, thereby strategically shifting the weight of the apparatus 20 and reducing the amount of muscle engagement and pinch force required to operate the instrument portion 34 which, in turn, reduces user fatigue, discomfort, and injury (that are often caused by the grip and force transfer limitations of traditional, relatively rigid hand tool handles), and encourages proper positioning of the instrument portion 34. Additionally, in at least one embodiment, the capacity for selective shaping of the apparatus 20 (by virtue of the selective bendability of the handle portion 22) allows for better visual access into an operating site (i.e., the location in which the instrument portion 34 is being used)—such as a mouth 40 of a patient, for example—while also permitting non-linear universal access into the operating site. As a result, in at least one embodiment, the apparatus 20 is capable of maximizing the access, functionality, effectiveness, and reach of the instrument portion 34 while improving ergonomics and reducing muscle fatigue. Thus, in at least one such embodiment, the apparatus 20 provides a solution for instrumentation on patients who have a limited opening, such as pediatrics, trismus, arthritic temporomandibular joints, and any other systemic conditions that may affect the patient's ability to open their mouth widely.

Aspects of the present specification may also be described as the following embodiments:

A hand tool apparatus including a handle portion having a first handle end elongate segment, a second handle end elongate segment, and a bendable core positioned between the first handle end and the second handle end, wherein the first handle end elongate segment and the second handle end elongate segment define rigid sections at opposing ends of the handle portion and the bendable core defines a bendable length of the elongate handle portion in a central section of the handle portion.

The apparatus may also include any combination of features, such as, for example:
the first handle end elongate segment, the second handle end elongate segment, and the bendable core are encased by a covering;
the bendable core comprises a first coil and a second coil;
the first coil is positioned radially within the second coil such that an exterior diameter of the first coil is less than an interior diameter of the second coil;
the second coil comprises a strand having a triangular cross section and oriented in a helical configuration such that an apex of the triangular cross section is directed radially inward toward the first coil;
the first coil comprises a circular or ovoid cross section and is configured such that when the bendable core is bent, the apex of the triangular cross section is positioned within turns of the first coil;
the first handle end elongate segment comprises an internal core opening to receive an instrument portion and an outer surface having a variable outer diameter, and the second handle end elongate segment comprises an internal core opening to receive an instrument portion and an outer surface having a variable outer diameter;
the outer surface of the first handle end elongate segment and the outer surface of the second handle end elongate segment is shaped in a generally triangular cross section;
the outer surface of the first handle end elongate segment and the outer surface of the second handle end elongate segment comprises perturbations extending outwardly therefrom;
the outer surface of the first handle end elongate segment and the outer surface of the second handle end elongate segment flares such that an outer diameter of the outer surface of the first handle end elongate segment and the outer surface of the second handle end elongate segment increases from and end comprising the internal core opening toward an end at the bendable core and then decreases from a maximum outer diameter toward the end at the bendable core;
the first handle end elongate segment and the second handle end elongate segment comprises indentations formed configured as thumb and finger placement guides, these guides may function to 1) guide the pads of the clinicians thumb, index, and middle fingers for correct placement on the grip portion of the instrument 2) improve ergonomic performance and operator comfort, 3) provide a quick reference of the blade orientation to more quickly indicate appropriate working end and orientation to the tooth surface, or 4) any combination thereof;
each of the first handle end elongate segment and the second handle end elongate segment comprise three indentations configured to create a generally triangular cross sectional shape to the first handle end elongate segment and the second handle end elongate segment;
the covering comprises a material that is capable of withstanding repeated standard sterilization procedures;
the material of the covering comprises a shore hardness of 20 to 90 on the Shore A scale; the material of the covering comprises a medical grade heat shrinkable material;
the material of the covering comprises a biocompatible materials such as silicone, polyolefin, FEP, PTFE, PFA, or combinations thereof.
a first instrument portion positioned within and extending from the first handle end elongate segment, and a second instrument portion positioned within and extending from the second handle end elongate segment;
the first instrument portion is removably attachable or fixed to the first handle end elongate segment, and the second instrument portion is removably attachable or fixed to the second handle end elongate segment, in an exemplary embodiment the final instrument has permanently attached working ends that are not removable after attachment;
the covering comprises a varying thickness; and the covering comprises a reduced thickness along at least a portion of the first handle end elongate segment, the second handle end elongate segment, or both the first handle end elongate segment and the second handle end elongate segment.

Aspects of the present specification may also be described as the following embodiments: a method of using a hand tool apparatus including providing the hand tool having a handle portion having a first handle end elongate segment, a second handle end elongate segment, and a bendable core positioned between the first handle end and the second handle end, wherein the first handle end elongate segment and the second handle end elongate segment define rigid sections at opposing ends of the handle portion and the bendable core defines a bendable length of the elongate handle portion in a central section of the handle portion; bending the central section of the handle portion to ergonomically conform to a hand of a user while shifting instrumentation forces and a fulcrum of the apparatus to encourage proper positioning of an instrument portion ending from the first handle end elongate segment; and using the instrument portion of the handle tool while maintaining the ergonomically conformed position of the handle portion during use of the apparatus.

The method may also include using the instrument portion by scraping the instrument portion along a tooth of a patient.

The method may include using the instrument portion working distal ends to debride deposits from tooth surfaces.

The method may include using the instrument portion to measure pocket depths or other dental functions such as placing and manipulating dental materials, applying treatments of any sort, assisting with retraction, positioning, instrumentation, or aerosol mitigation.

In closing, regarding the exemplary embodiments of the present invention as shown and described herein, it will be appreciated that a hand tool apparatus having an adaptive ergonomic handle is disclosed. Because the principles of the invention may be practiced in a number of configurations beyond those shown and described, it is to be understood that the invention is not in any way limited by the exemplary embodiments, but is generally directed to a hand tool apparatus having an adaptive ergonomic handle and is able to take numerous forms to do so without departing from the spirit and scope of the invention. It will also be appreciated by those skilled in the art that the present invention is not limited to the particular geometries and materials of construction disclosed, but may instead entail other functionally comparable structures or materials, now known or later developed, without departing from the spirit and scope of the invention.

Certain embodiments of the present invention are described herein, including the best mode known to the inventor(s) for carrying out the invention. Of course, variations on these described embodiments will become apparent to those of ordinary skill in the art upon reading the foregoing description. The inventor(s) expect skilled artisans to employ such variations as appropriate, and the inventor(s) intend for the present invention to be practiced otherwise than specifically described herein. Accordingly, this invention includes all modifications and equivalents of the subject matter recited in the claims appended hereto as permitted by applicable law. Moreover, any combination of the above-described embodiments in all possible variations thereof is encompassed by the invention unless otherwise indicated herein or otherwise clearly contradicted by context.

Groupings of alternative embodiments, elements, or steps of the present invention are not to be construed as limitations. Each group member may be referred to and claimed individually or in any combination with other group members disclosed herein. It is anticipated that one or more members of a group may be included in, or deleted from, a group for reasons of convenience and/or patentability. When any such inclusion or deletion occurs, the specification is deemed to contain the group as modified thus fulfilling the written description of all Markush groups used in the appended claims.

Unless otherwise indicated, all numbers expressing a characteristic, item, quantity, parameter, property, term, and so forth used in the present specification and claims are to be understood as being modified in all instances by the term "about." As used herein, the term "about" means that the characteristic, item, quantity, parameter, property, or term so qualified characteristic, item, quantity, parameter, property, or term. Accordingly, unless indicated to the contrary, the numerical parameters set forth in the specification and attached claims are approximations that may vary. At the very least, and not as an attempt to limit the application of the doctrine of equivalents to the scope of the claims, each numerical indication should at least be construed in light of the number of reported significant digits and by applying ordinary rounding techniques. Notwithstanding that the numerical ranges and values setting forth the broad scope of the invention are approximations, the numerical ranges and values set forth in the specific examples are reported as precisely as possible. Any numerical range or value, however, inherently contains certain errors necessarily resulting from the standard deviation found in their respective testing measurements. Recitation of numerical ranges of values herein is merely intended to serve as a shorthand method of referring individually to each separate numerical value falling within the range. Unless otherwise indicated herein, each individual value of a numerical range is incorporated into the present specification as if it were individually recited herein. Similarly, as used herein, unless indicated to the contrary, the term "substantially" is a term of degree intended to indicate an approximation of the characteristic, item, quantity, parameter, property, or term so qualified, encompassing a range that can be understood and construed by those of ordinary skill in the art.

Use of the terms "may" or "can" in reference to an embodiment or aspect of an embodiment also carries with it the alternative meaning of "may not" or "cannot." As such, if the present specification discloses that an embodiment or an aspect of an embodiment may be or can be included as part of the inventive subject matter, then the negative limitation or exclusionary proviso is also explicitly meant, meaning that an embodiment or an aspect of an embodiment may not be or cannot be included as part of the inventive subject matter. In a similar manner, use of the term "optionally" in reference to an embodiment or aspect of an embodiment means that such embodiment or aspect of the embodiment may be included as part of the inventive subject matter or may not be included as part of the inventive subject matter. Whether such a negative limitation or exclusionary proviso applies will be based on whether the negative limitation or exclusionary proviso is recited in the claimed subject matter.

The terms "a," "an," "the" and similar references used in the context of describing the present invention (especially in the context of the following claims) are to be construed to cover both the singular and the plural, unless otherwise indicated herein or clearly contradicted by context. Further, ordinal indicators—such as "first," "second," "third," etc.—for identified elements are used to distinguish between the elements, and do not indicate or imply a required or limited number of such elements, and do not indicate a particular position or order of such elements unless otherwise specifically stated. All methods described herein can be performed context. The use of any and all examples, or exemplary language (e.g., "such as") provided herein is intended merely to better illuminate the present invention and does not pose a limitation on the scope of the invention otherwise claimed. No language in the present specification should be construed as indicating any non-claimed element essential to the practice of the invention.

When used in the claims, whether as filed or added per amendment, the open-ended transitional term "comprising" (along with equivalent open-ended transitional phrases thereof such as "including," "containing" and "having") encompasses all the expressly recited elements, limitations, steps, and/or features alone or in combination with un-recited subject matter; the named elements, limitations and/or features are essential, but other unnamed elements, limitations, and/or features may be added and still form a construct within the scope of the claim. Specific embodiments disclosed herein may be further limited in the claims using the closed-ended transitional phrases "consisting of" or "consisting essentially of" in lieu of or as an amendment for "comprising." When used in the claims, whether as filed or added per amendment, the closed-ended transitional phrase "consisting of" excludes any element, limitation, step, or feature not expressly recited in the claims. The closed-ended transitional phrase "consisting essentially of" limits the scope of a claim to the expressly recited elements, limitations, steps, and/or features and any other elements, limitations, steps, and/or features that do not materially affect the basic and novel characteristic(s) of the claimed subject matter. Thus, the meaning of the open-ended transitional phrase "comprising" is being defined as encompassing all the specifically recited elements, limitations, steps, and/or features as well as any optional, additional unspecified ones. The meaning of the closed-ended transitional phrase "consisting of" is being defined as only including those elements, limitations, steps, and/or features specifically recited in the claim, whereas the meaning of the closed-ended transitional phrase "consisting essentially of" is being defined as only including those elements, limitations, steps, and/or features specifically recited in the claim and those elements, limitations, steps, and/or features that do not materially affect the basic and novel characteristic(s) of the claimed subject matter. Therefore, the open-ended transitional phrase "comprising" (along with equivalent open-ended transitional phrases thereof) includes within its meaning, as a limiting case, claimed subject matter specified by the closed-ended transitional phrases "consisting of" or "consisting essentially of." As such, embodiments described herein or so claimed with the phrase "comprising" are expressly or inherently unambiguously described, enabled and supported herein for the phrases "consisting essentially of" and "consisting of."

All patents, patent publications, and other publications referenced and identified in the present specification are individually and expressly incorporated herein by reference in their methodologies described in such publications that might be used in connection with the present invention. These publications are provided solely for their disclosure prior to the filing date of the present application. Nothing in this regard should be construed as an admission that the inventors are not entitled to antedate such disclosure by virtue of prior invention or for any other reason. All statements as to the date or representation as to the contents of these documents is based on the information available to the applicants and does not constitute any admission as to the correctness of the dates or contents of these documents.

While aspects of the invention have been described with reference to at least one exemplary embodiment, it is to be clearly understood by those skilled in the art that the invention is not limited thereto. Rather, the scope of the invention is to be interpreted only in conjunction with the appended claims and it is made clear, here, that the inventor(s) believe that the claimed subject matter is the invention.

What is claimed is:

1. A hand tool apparatus comprising:
    an elongate, adaptive ergonomic handle portion comprising:
        a rigid first handle end;
        a rigid second handle end; and
        an at least one bendable core positioned between the first handle end and the second handle end, the at least one bendable core comprising a first coil positioned radially within a second coil such that an exterior diameter of the first coil is less than an interior diameter of the second coil, the second coil comprising a strand having a triangular cross section and oriented in a helical configuration such that an apex of the triangular cross section is directed radially inward toward the first coil, wherein the at least one bendable core is capable of being selectively bent into a variety of desired shape configurations, and substantially maintaining those shape configurations until the core is intentionally bent into a different desired shape configuration; and
    at least one instrument portion extending from at least one of the first handle end and the second handle end.

2. The apparatus of claim 1, wherein the first handle end, the second handle end, and the bendable core are encased by a covering.

3. The apparatus of claim 2, wherein the covering comprises a material that is capable of withstanding repeated heat sterilization.

4. The apparatus of claim 3, wherein the material of the covering comprises a medical grade heat shrinkable material of a shore hardness of 20 to 90 on the Shore A scale.

5. The apparatus of claim 2, wherein the covering comprises a varying thickness.

6. The apparatus of claim 5, wherein the covering comprises a reduced thickness along at least a portion of the first handle end, the second handle end, or both the first handle end and the second handle end.

7. The apparatus of claim 1, wherein the first coil comprises a circular or ovoid cross section and is configured such that when the bendable core is bent, the apex of the triangular cross section is positioned within turns of the first coil.

8. The apparatus of claim 1, wherein the first handle end comprises an internal core opening to receive a first one of the at least one instrument portion and an outer surface having a variable outer diameter, and the second handle end comprises an internal core opening to receive a second one of the at least one instrument portion and an outer surface having a variable outer diameter.

9. The apparatus of claim 1, wherein an outer surface of the first handle end and an outer surface of the second handle end is shaped in a generally triangular cross section.

10. The apparatus of claim 9, wherein the first handle end and the second handle end provides a plurality of indentations positioned and configured as thumb and finger placement guides.

11. The apparatus of claim 10, wherein each of the first handle end and the second handle end provides three indentations configured to create a generally triangular cross sectional shape to the first handle end and the second handle end.

12. The apparatus of claim 1, wherein an outer surface of the first handle end and an outer surface of the second handle end comprises provides a plurality of protuberances extending outwardly therefrom.

13. The apparatus of claim 8, wherein an outer surface of the first handle end and an outer surface of the second handle end flares such that an outer diameter of the outer surface of the first handle end and the outer surface of the second handle end increases from an end comprising the internal core opening toward an end at the bendable core and then decreases from a maximum outer diameter toward the end at the bendable core.

14. The apparatus of claim 1, further comprising a first instrument portion positioned within and extending from the first handle end, and a second instrument portion positioned within and extending from the second handle end.

15. The apparatus of claim 14, wherein the first instrument portion is removably attachable or fixed to the first handle end, and the second instrument portion is removably attachable or fixed to the second handle end.

16. A hand tool apparatus comprising:
an elongate, adaptive ergonomic handle portion configured for being grasped by a hand of a user, the handle portion comprising:
a rigid first handle end;
a rigid second handle end;
at least one of the first handle end and second handle end comprising:
an instrument portion extending from a terminal end of said handle end;
an outer surface having a generally triangular shape in cross section defining three circumferentially arranged grip surfaces tapering toward the terminal end of said handle end; and
at least one of the three grip surfaces providing a substantially elliptical shaped finger placement guide oriented toward the terminal end of said handle end, each of the at least one finger placement guide positioned and configured for receiving a pad of the user's thumb, index finger or middle finger, respectively, upon said handle end being grasped by the hand of the user, thereby facilitating a proper grip of the handle portion while also ensuring that the instrument portion is in a proper orientation relative to the user's hand; and
an at least one bendable core positioned between the first handle end and the second handle end, the at least one bendable core constructed as at least one of a multi-stranded wire-shaped structure or a coil-shaped structure so as to be capable of being selectively bent into a variety of desired shape configurations, and substantially maintaining those shape configurations until the core is intentionally bent into a different desired shape configuration.

17. A method of using the hand tool apparatus of claim 16 comprising the steps of:
bending the at least one bendable core to ergonomically conform to the user's hand while shifting instrumentation forces and a fulcrum of the apparatus to encourage proper positioning of the instrument portion extending from the terminal end of at least one of the first handle end and second handle end; and
using the instrument portion while maintaining the ergonomically conformed position of the handle portion relative to the user's hand during use of the apparatus.

18. The method of claim 17, further comprising the steps of:
grasping one of the first handle end or second handle end with user's hand;
positioning a pad of at least one of a thumb, index finger and middle finger, respectively, of the user's hand within each of the at least one finger placement guide of the first handle end or second handle end being grasped by the user's hand, thereby facilitating a proper grip of the handle portion while also ensuring that the instrument portion is in a proper orientation relative to the user's hand.

* * * * *